United States Patent
Sun et al.

(10) Patent No.: US 11,252,583 B2
(45) Date of Patent: Feb. 15, 2022

(54) COMMUNICATION METHOD, RELATED DEVICE, AND SYSTEM

(71) Applicant: HUAWEI TECHNOLOGIES CO., LTD., Guangdong (CN)

(72) Inventors: Haiyang Sun, Beijing (CN); Yizhuang Wu, Beijing (CN); Chunshan Xiong, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 153 days.

(21) Appl. No.: 16/811,662

(22) Filed: Mar. 6, 2020

(65) Prior Publication Data

US 2020/0213876 A1 Jul. 2, 2020

Related U.S. Application Data

(63) Continuation of application No. PCT/CN2018/104551, filed on Sep. 7, 2018.

(30) Foreign Application Priority Data

Sep. 7, 2017 (CN) .......................... 201710814685.7

(51) Int. Cl.
*H04W 24/02* (2009.01)
*H04L 12/24* (2006.01)
(Continued)

(52) U.S. Cl.
CPC ......... *H04W 24/02* (2013.01); *H04L 41/0893* (2013.01); *H04L 41/14* (2013.01); *H04M 15/66* (2013.01); *H04W 80/10* (2013.01)

(58) Field of Classification Search
None
See application file for complete search history.

(56) References Cited

U.S. PATENT DOCUMENTS

| | | |
|---|---|---|
| 9,237,155 B1 | 1/2016 | Cavage et al. |
| 2016/0127265 A1 | 5/2016 | Cavage et al. |
| 2017/0026413 A1 | 1/2017 | Goldschlag et al. |

FOREIGN PATENT DOCUMENTS

| | | |
|---|---|---|
| CN | 102136099 A | 7/2011 |
| CN | 102546751 A | 7/2012 |

(Continued)

OTHER PUBLICATIONS

Ericsson,"PCF Discovery and Selection",SA WG2 Meeting #121,S2-173007,May 15-19, 2017, Hangzhou, China, total 5 pages.

(Continued)

*Primary Examiner* — James P Duffy
(74) *Attorney, Agent, or Firm* — Womble Bond Dickinson (US) LLP

(57) ABSTRACT

This specification discloses a communication method, and a system. The method includes: receiving, by a first control network element, analysis information of a network data analytics network element NWDA, and generating a policy based on the analysis information; sending, by the first control network element, the policy to a second control network element, where execution of the policy is controlled by the second control network element; receiving, by the first control network element, an execution result of the policy that is sent by the second control network element, and determining, based on the execution result, whether the analysis information is invalid; and sending, by the first control network element, an invalidity notification message to the NWDA when the first control network element determines that the analysis information is invalid, where the invalidity notification message is used to instruct the NWDA to generate new analysis information.

20 Claims, 16 Drawing Sheets

(51) Int. Cl.
H04M 15/00 (2006.01)
H04W 80/10 (2009.01)

(56) References Cited

FOREIGN PATENT DOCUMENTS

| | | |
|---|---|---|
| CN | 103532749 A | 1/2014 |
| CN | 105847237 A | 8/2016 |
| CN | 107113193 A | 8/2017 |
| WO | 2014022755 A3 | 5/2014 |

OTHER PUBLICATIONS

Huawei,"Discussion about Big Data Driven Network Architecture", SA WG2 Meeting #121, S2-173192, May 15-19, 2017,Hangzhou, China, total 11 pages.
China Telecom,"Update NWDA Services in TS23.502",3GPP TSG SA WG2 Meeting #122, S2-174493, Jun. 26-30, 2017, San Jose Del Cabo, Mexico, total 3 pages.
Nokia, "Ts 23.501: P-CR to update Policy Architecture Requirements", Sa WG2 Meeting #120 52-172035,2017-03-31,total 4 pages.
China Telecom, "Update NWDA Services in TS23.502", 3GPP Tsg Sa WG2 Meeting #122 52-174496,2017-06-30,total 3 pages.

COMMUNICATION METHOD, RELATED DEVICE, AND SYSTEM

CROSS-REFERENCE TO RELATED APPLICATIONS

This application is a continuation of International Application No. PCT/CN2018/104551, filed on Sep. 7, 2018, which claims priority to Chinese Patent Application No. 201710814685.7, filed on Sep. 7, 2017, The disclosures of the aforementioned applications are hereby incorporated by reference in their entireties.

TECHNICAL FIELD

This application relates to the field of wireless communications technologies, and in particular, to a communication method, a related device, and a system.

BACKGROUND

In a network structure of a communications standard, especially a fifth-generation mobile communications network architecture, a network architecture related to policy control includes a network data analytics (NWDA) network element. The NWDA can analyze big data, and can send analysis information obtained through analysis to a policy control function (PCF) network element in the network architecture. The PCF can generate a policy based on the analysis information sent by the NWDA, and can send the generated policy to a policy control execution network element, for example, an access and mobility management function (AMF) or a session management function (SMF) in the network architecture. The policy control execution network element can control the policy to be executed.

Currently, the analysis information of the NWDA is determined based on data obtained by the NWDA. Because obtaining the data is time-consuming, the NWDA needs to take a relatively long time to generate new analysis information. Consequently, accuracy of a policy generated based on the analysis information is affected.

SUMMARY

This application provides a communication method, a related device, and a system, to improve accuracy of policy execution.

According to a first aspect, this application provides a communication method. The method includes: receiving, by a first control network element, analysis information of a network data analytics network element NWDA, and generating a policy based on the analysis information; sending, by the first control network element, the policy to a second control network element, where execution of the policy is controlled by the second control network element; receiving, by the first control network element, an execution result of the policy that is sent by the second control network element, and determining, based on the execution result, whether the analysis information is invalid; and sending, by the first control network element, an invalidity notification message to the NWDA when the first control network element determines that the analysis information is invalid, where the invalidity notification message is used to instruct the NWDA to generate new analysis information.

In one embodiment, the analysis information may include at least one of user analysis information, network slice analysis information, analysis information related to an operator specific service, and session analysis information.

It can be learned that when the first control network element feeds back the invalidity notification message in time, the NWDA can generate the new analysis information in time, so that the first control network element can generate, based on the new analysis information, a policy more applicable to a communications system, thereby ensuring accuracy of policy execution.

In one embodiment, the invalidity notification message includes an information identifier, and the information identifier corresponds to the analysis information. Therefore, the NWDA can determine invalid analysis information in time based on the information identifier.

In one embodiment, the analysis information carries a maximum quantity of failures, and the determining, by the first control network element based on the execution result, whether the analysis information is invalid includes: determining, by the first control network element, whether a quantity of received execution failures in the received execution result reaches the maximum quantity of failures; and when determining that the quantity of received execution failures reaches the maximum quantity of failures, determining, by the first control network element, that the analysis information is invalid.

It can be learned that an invalidity threshold of the analysis information is determined by using the maximum quantity of failures of the analysis information, and then the analysis information may be updated in time, to generate new analysis information.

In one embodiment, the determining, by the first control network element based on the execution result, whether the analysis information is invalid includes: counting, by the first control network element, a percentage of a quantity of execution failures that are in the received execution result in an execution quantity; and if the percentage is greater than a first threshold, determining, by the first control network element, that the analysis information is invalid. In one embodiment, the first threshold may be preconfigured. Alternatively, the first threshold may be determined based on the analysis information, and then, different first thresholds may be determined based on different analysis information.

In one embodiment, the first control network element determines whether a quantity of received execution results reaches a second threshold; and when determining that the quantity of execution results reaches the second threshold, the first control network element counts the percentage of the quantity of execution failures that are in the received execution result in the execution quantity.

It can be learned that, in the foregoing embodiment, the quantity can be determined, to avoid erroneous determining of the execution result.

In one embodiment, the method further includes: receiving, by the first control network element, a confirmation message sent by the NWDA, where the confirmation message is sent by the NWDA after the NWDA receives the invalidity notification message, the confirmation message carries a cooling time, and the cooling time is used to indicate duration used by the NWDA to generate new analysis information; and sending, by the first control network element, a request message to the NWDA after the cooling time, where the request message is used to request the new analysis information.

It can be learned that, in the foregoing embodiment, the first control network element can learn of a moment for requesting the analysis information, to avoid invalid communication.

According to a second aspect, this application provides a communication method. The method includes: sending, by a network data analytics network element NWDA, analysis information to a first control network element, where the analysis information is used to instruct the first control network element to generate a policy based on the analysis information; receiving, by the NWDA, an invalidity notification message sent by the first control network element, where the invalidity notification message is used to instruct the NWDA to generate new analysis information; and generating, by the NWDA, the new analysis information.

According to a third aspect, this application provides a communication method. The method includes: receiving, by a second control network element, a policy sent by a first control network element, where the policy is generated based on analysis information that is sent by a network data analytics network element NWDA; controlling, by the second control network element, execution of the policy, and learning of an execution result of the policy; and sending, by the second control network element, the execution result to the first control network element, where the first control network element is configured to determine, based on the execution result, whether the analysis information is invalid.

According to a fourth aspect, this application provides a communication method. The method includes:

receiving, by a first control network element, analysis information of a network data analytics network element NWDA, and generating a policy based on the analysis information;

sending, by the first control network element, the policy to a second control network element, where execution of the policy is controlled by the second control network element; and receiving, by the first control network element, an execution result of the policy that is sent by the second control network element, and sending the execution result to the NWDA, where the execution result is used by the NWDA to determine whether the analysis information is invalid.

In one embodiment, the invalidity notification message includes an information identifier, and the information identifier corresponds to the analysis information.

According to a fifth aspect, an embodiment of this application provides a communication method. The method includes:

sending, by a network data analytics network element NWDA, analysis information to a first control network element; and receiving, by the NWDA, the execution result sent by the first control network element, and determining, based on the execution result, whether the analysis information is invalid.

The NWDA can learn of the analysis information specific to the execution result when receiving the execution result. For example, the execution result may carry an information identifier, the information identifier and the analysis information, or the execution result carries another identifier that corresponds to the analysis information.

In one embodiment, the determining, by the NWDA based on the execution result, whether the analysis information is invalid includes:

determining, by the NWDA, whether a quantity of execution failures in the received execution result reaches a maximum quantity of failures that corresponds to the analysis information, and if the quantity of received execution failures reaches the maximum quantity of failures, determining that the analysis information is invalid, where the maximum quantity of failures corresponds to the analysis information.

In one embodiment, the determining, by the NWDA based on the execution result, whether the analysis information is invalid includes:

counting, by the NWDA, a percentage of a quantity of execution failures that are in the received execution result in an execution quantity; and if the percentage is greater than a first threshold, determining, by the NWDA, that the analysis information is invalid.

In one embodiment, the first threshold is preconfigured, or the first threshold is associated with the analysis information.

In one embodiment, the method further includes:

determining, by the NWDA, whether a quantity of received execution results reaches a second threshold; and the counting, by the NWDA, a percentage of a quantity of execution failures that are in the received execution result includes:

when determining that the quantity of execution results reaches the second threshold, counting, by the NWDA, the percentage of the execution failures that are in the received execution result.

In one embodiment, the method further includes:

when the NWDA determines that the analysis information is invalid, sending an invalidity notification message for the analysis information to the first control network element, where the invalidity notification message carries a cooling time, and the cooling time is used to indicate duration used by the NWDA to update the analysis information; and generating, by the NWDA, new analysis information.

In one embodiment, the NWDA can learn of the execution result corresponding to the generated analysis information in time. In this way, the NWDA can update the analysis information in time, and the analysis information generated by the NWDA is more accurate.

According to a sixth aspect, an embodiment of this application provides a communication method. The method includes:

receiving, by a second control network element, a policy sent by a first control network element, where the policy is generated based on analysis information of a network data analytics network element NWDA;

controlling, by the second control network element, execution of the policy, and learning of an execution result of the policy; and sending, by the second control network element, the execution result to the NWDA by using the first control network element, where the execution result is used by the NWDA to determine whether the analysis information is invalid.

In one embodiment, the first control network element may feed back the execution result to the NWDA, and the NWDA determines whether the corresponding analysis information is invalid. In this way, the NWDA can determine invalid analysis information in time, and generate new analysis information.

According to a seventh aspect, an embodiment of this application provides a communication method. The method includes:

receiving, by a first control network element, analysis information of a network data analytics network element NWDA, and generating a policy based on the analysis information; and sending, by the first control network element, the policy to the second control network element, where an execution result of the policy is sent by the second control network element to the NWDA, and the execution result of the policy is used by the NWDA to determine whether the analysis information is invalid.

According to an eighth aspect, an embodiment of this application provides a communication method. The method includes:

sending, by a network data analytics network element NWDA, analysis information to a first control network element, where the analysis information is used by the first control network element to generate a policy, and the policy is sent by the first control network element to a second control network element, and execution of the policy is controlled by the second control network element;

receiving, by the NWDA, an execution result of the policy that is sent by the second control network element; and determining, by the NWDA based on the execution result, whether the analysis information is invalid.

For a manner of determining, by the NWDA, whether the analysis information is invalid, refer to related descriptions in the fifth aspect.

According to a ninth aspect, an embodiment of this application provides a communication method. The method includes:

receiving, by a second control network element, a policy sent by a first control network element, where the policy is generated based on analysis information of a network data analytics network element NWDA;

controlling, by the second control network element, execution of the policy, and learning of an execution result of the policy; and sending, by the second control network element, the execution result to the NWDA, where the execution result is used by the NWDA to determine whether the analysis information is invalid.

In one embodiment, the second control network element can directly feed back the execution result of the policy to the NWDA, so that the NWDA can determine, in a more timely manner, whether the analysis information is invalid.

According to a tenth aspect, an embodiment of this application provides a communication method. The method includes:

sending, by a network data analytics network element NWDA, analysis information to a second control network element, where the analysis information is used by the second control network element to generate a policy, and execution of the policy is controlled by the second control network element;

receiving, by the NWDA, an execution result of the policy that is of the second control network element; and determining, by the NWDA based on the execution result, whether the analysis information is invalid.

According to an eleventh aspect, an embodiment of this application provides a communication method. The method includes:

receiving, by a second control network element, analysis information sent by a network data analytics network element NWDA;

generating, by the second control network element, a policy based on the analysis information, and controlling execution of the policy; and learning, by the second control network element, of an execution result of the policy, and sending the execution result to the NWDA, where the execution result is used by the NWDA to determine whether the analysis information is invalid.

In one embodiment, the second control network element can directly generate the policy based on the analysis information of the NWDA, thereby reducing costs for arranging a first control network element in a communication system, and simplifying network element interaction in the communication system.

According to a twelfth aspect, an embodiment of this application provides a first control network element, for example, a PCF. The first control network element is configured to implement any method in the first aspect, the fourth aspect, and the seventh aspect. The first control network element may implement the foregoing method by using hardware, or may implement the foregoing method by using hardware executing corresponding software. The hardware or software includes one or more functional units. In this embodiment of the present application, the first control network element may include a receiving unit, a processing unit, and a sending unit.

According to a thirteenth aspect, an embodiment of this application provides a network data analytics network element NWDA. The NWDA is configured to implement any method in the second aspect, the fifth aspect, the eighth aspect, and the tenth aspect. The NWDA may implement the foregoing method by using hardware, or may implement the foregoing method by using hardware executing corresponding software. The hardware or software includes one or more functional units. In this embodiment of the present application, the NWDA may include a receiving unit, a processing unit, and a sending unit.

According to a fourteenth aspect, an embodiment of this application provides a second control network element, such as an AMF or an SMF. The second control network element is configured to implement any method in the third aspect, the sixth aspect, the ninth aspect, and the eleventh aspect. The second control network element may implement the foregoing method by using hardware, or may implement the foregoing method by using hardware executing corresponding software. The hardware or software includes one or more functional units. In this embodiment of the present application, the second control network element may include a receiving unit, a processing unit, and a sending unit.

According to a fifteenth aspect, an embodiment of this application provides a first control network element, for example, a PCF, including a processor, a memory, and a computer program that is stored in the memory and that can be invoked and executed by the processor. The processor invokes the computer program to perform any method in the first aspect, the fourth aspect, and the seventh aspect.

According to a sixteenth aspect, an embodiment of this application provides a network data analytics network element NWDA, including a processor, a memory, and a computer program that is stored in the memory and that can be invoked and executed by the processor. The processor invokes the computer program to perform any method in the second aspect, the fifth aspect, the eighth aspect, and the tenth aspect.

According to a seventeenth aspect, an embodiment of this application provides a second control network element, such as an AMF or an SMF, including a processor, a memory, and a computer program that is stored in the memory and that can be invoked and executed by the processor. The processor invokes the computer program to perform any method in the third aspect, the sixth aspect, the ninth aspect, and the eleventh aspect.

According to an eighteenth aspect, an embodiment of this application provides a readable non-volatile storage medium that stores a computer instruction. The computer instruction is executed by a data processing device to implement any one of the foregoing methods.

According to a nineteenth aspect, an embodiment of this application provides a computer program product, stored in a storage medium. The computer program product includes a computer instruction used to implement any one of the foregoing methods.

BRIEF DESCRIPTION OF DRAWINGS

To describe the technical solutions in the embodiments of this application or in the background more clearly, the following describes the accompanying drawings required for describing the embodiments of this application or the background.

DESCRIPTION OF EMBODIMENTS

Terms used in this application are only used to explain specific embodiments of this application, and are not intended to limit this application.

For ease of understanding of the embodiments of this application, the following describes a communications system and a related application scenario in the embodiments of this application.

Figure 1:
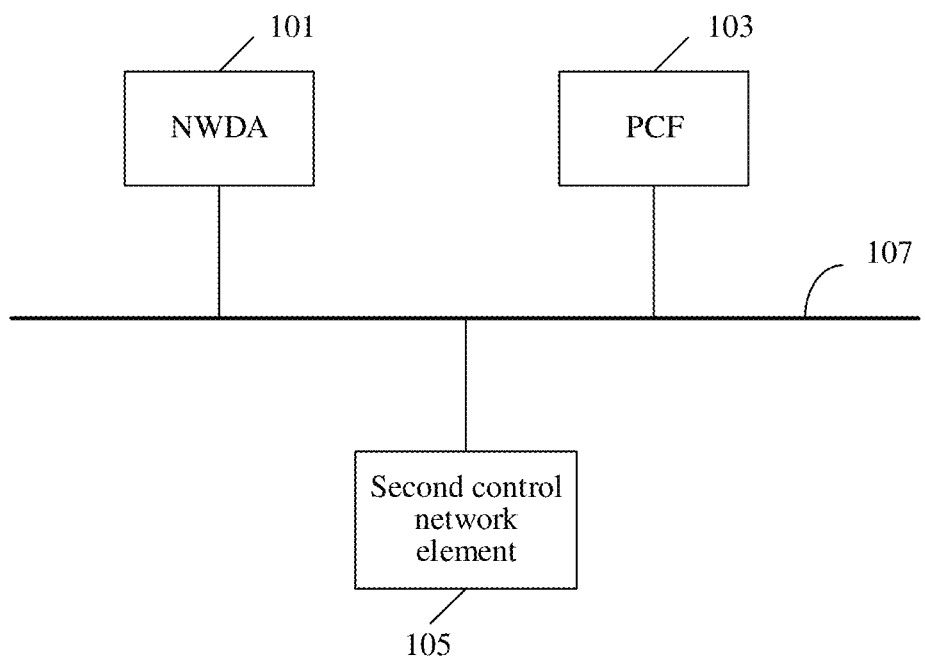
FIG. 1 is a schematic structural diagram of a communications system according to an embodiment of this application.

FIG. 1 is a schematic diagram of structural composition of a communications system 100 according to this application. The communications system 100 includes a network data analytics network element NWDA 101, a first control network element PCF 103, and one or more second control network elements 105. The second control network element 105 may be an AMF or an SMF.

The NWDA 101, the PCF 103, and the second control network element 105 may be connected by using a bus 107. The bus 107 herein means that connection and communication between network elements in the communications system can be logically implemented, and connection and communication between the network elements in the communications system can be implemented by using an interface or a network.

In a scenario, connection and communication are implemented between the NWDA 101 and the PCF 103, and connection and communication are implemented between the PCF 103 and the second control network element 105. Specifically, after obtaining sample data, the NWDA 101 may establish an analysis model based on an algorithm that is related to the sample data, and output analysis information based on the analysis model. The NWDA 101 may send the analysis information to the PCF 103. The PCF 103 may determine a policy based on the received analysis information. The PCF 103 may send the policy to the second control network element 105, and the second control network element 105 executes the policy, or the second control network element 105 controls a corresponding network element to execute the policy.

In another scenario, connection and communication are implemented between the NWDA 101 and the second control network element 105. Specifically, the NWDA 101 sends analysis information to the corresponding second control network element 105. The second control network element 105 generates a policy based on the analysis information, and controls the execution of the policy.

Figure 2:
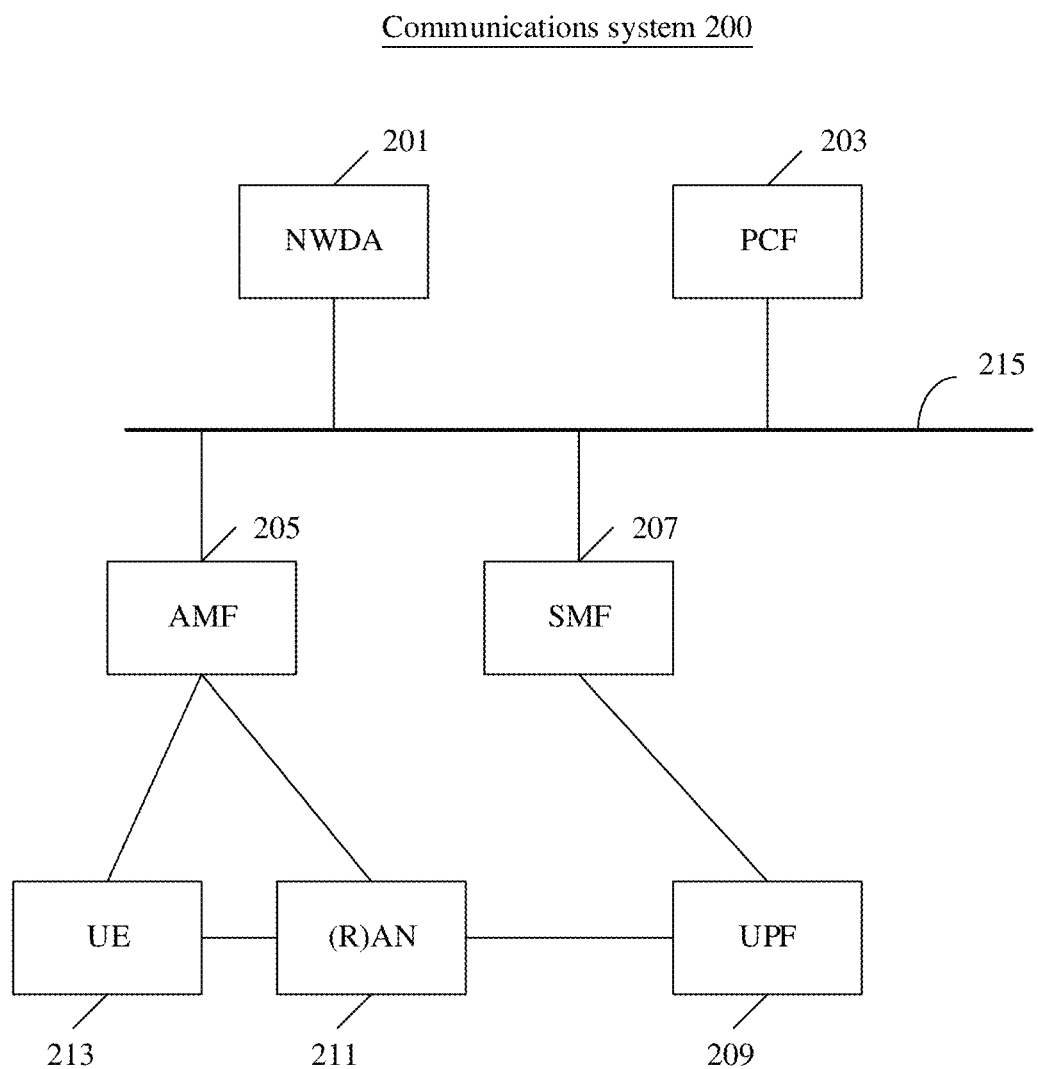
FIG. 2 is a schematic structural diagram of another communications system according to an embodiment of this application.

More specifically, the embodiments of this application may be further applied to a communications system 200 shown in FIG. 2. For a network-element composition structure of the communications system 200, refer to a non-roaming 5G policy framework architecture disclosed in the standard 3GPP (3rd generation partnership project) TS (technical specification) 23.501 V1.0.0. FIG. 2 shows only an example of network elements in the embodiments of this application. Certainly, the system may further include another network element. For a connection reference point between the network elements, refer to the non-roaming 5G policy framework architecture. Details are not described herein. As shown in FIG. 2, the communications system 200 includes an NWDA 201, a PCF 203, an access and mobility management function (AMF) network element 205, a session management function (SMF) network element 207, a user plane (UPF) network element 209, a (radio) access network ((R)AN) 211, and user equipment (UE) 213. A function of the (R)AN 211 may be implemented by a base station. Herein, the base station may include an evolved NodeB (eNB or eNodeB) in an LTE system or an LTE-advanced (LTE-A) system, or a small cell (micro/pico eNB) in an LTE system or an LTE-A system, or may include a next generation NodeB in an NR system, or a transmission point (TP), or may be a transmission reception point (TRP), or the like. This is not limited in the embodiments of this application.

The NWDA 201, the PCF 203, the AMF 205, and the SMF 207 may be connected by using a bus 215. The bus 215 herein means that connection and communication between network elements in the communications system can be logically implemented, and connection and communication between the network elements in the communications system can be implemented by using an interface or a network. The AMF is separately connected to the UE 213 and the (R)AN 211, and the AMF may be configured to control the UE 213 or the (R)AN 211 to execute a policy. The SMF is connected to the UPF 209, and the SMF may be configured to control the UPF 209 to execute a policy, or the SMF may be configured to control, by using the AMF, the UE 213 or the (R)AN 211 to execute a policy.

In the communications system 200, in a scenario, after obtaining sample data, the NWDA 201 may establish an analysis model based on an algorithm that is related to the sample data, and output analysis information based on the analysis model. The NWDA 201 may send the analysis information to the PCF 203. The PCF 203 may determine a policy based on the received analysis information. The determined policy may be specific to one or more network slices, or specific to an operator specific service of an operator. After determining the policy, the PCF 203 may send the policy to the AMF 205 or the SMF 207. To be specific, the AMF 205 or the SMF 207 can implement a function of a second control network element. Further, the policy may be specific to the second control network element or an execution network element. For example, after receiving the policy sent by the PCF, the AMF 205 may execute the policy. Alternatively, the second control network element may further deliver the policy to the execution network element. Herein, the execution network element may include any one of the UPF 209, the (R)AN 211, and the UE 213. For example, when receiving the policy sent by the PCF 203, the SMF 207 may deliver the policy to the UPF 209, and the UPF 209 executes the policy.

In another scenario, the NWDA 201 directly sends the analysis information to the AMF 205 or the SMF 207. The AMF 205 or the SMF 207 generates a policy based on the analysis information. The AMF 205 or the SMF 207 may execute the policy, or the AMF 205 or the SMF 2078 may control an execution network element to execute the policy. The execution network element may include any one of the UPF 209, the (R)AN 211, and the UE 213.

In the foregoing systems, the NWDA establishes or updates an analysis model based on a quantity of samples in sample data, an applied algorithm of a statistical sample, or another factor, and provides analysis information to the PCF based on the established or updated analysis model. The PCF generates a policy based on the analysis information, so that a corresponding network element executes the policy. Currently, in a policy execution process, the NWDA and the PCF cannot learn of an execution result of the policy, and consequently cannot learn of an execution hit rate of the policy. The execution hit rate of the policy is a percentage of successful policy execution in the execution result of the policy. If the execution hit rate of the policy is low, it indicates that a problem occurs in policy formulation, and the policy needs to be updated in time. However, because the NWDA and the PCF cannot learn of the execution result of the policy, the NWDA and the PCF cannot update the policy in time. Consequently, accuracy of policy execution in the communications system is affected.

With reference to the foregoing system and the technical problem that is to be resolved, the following describes the technical solutions in the embodiments of this application.

Figure 3A:
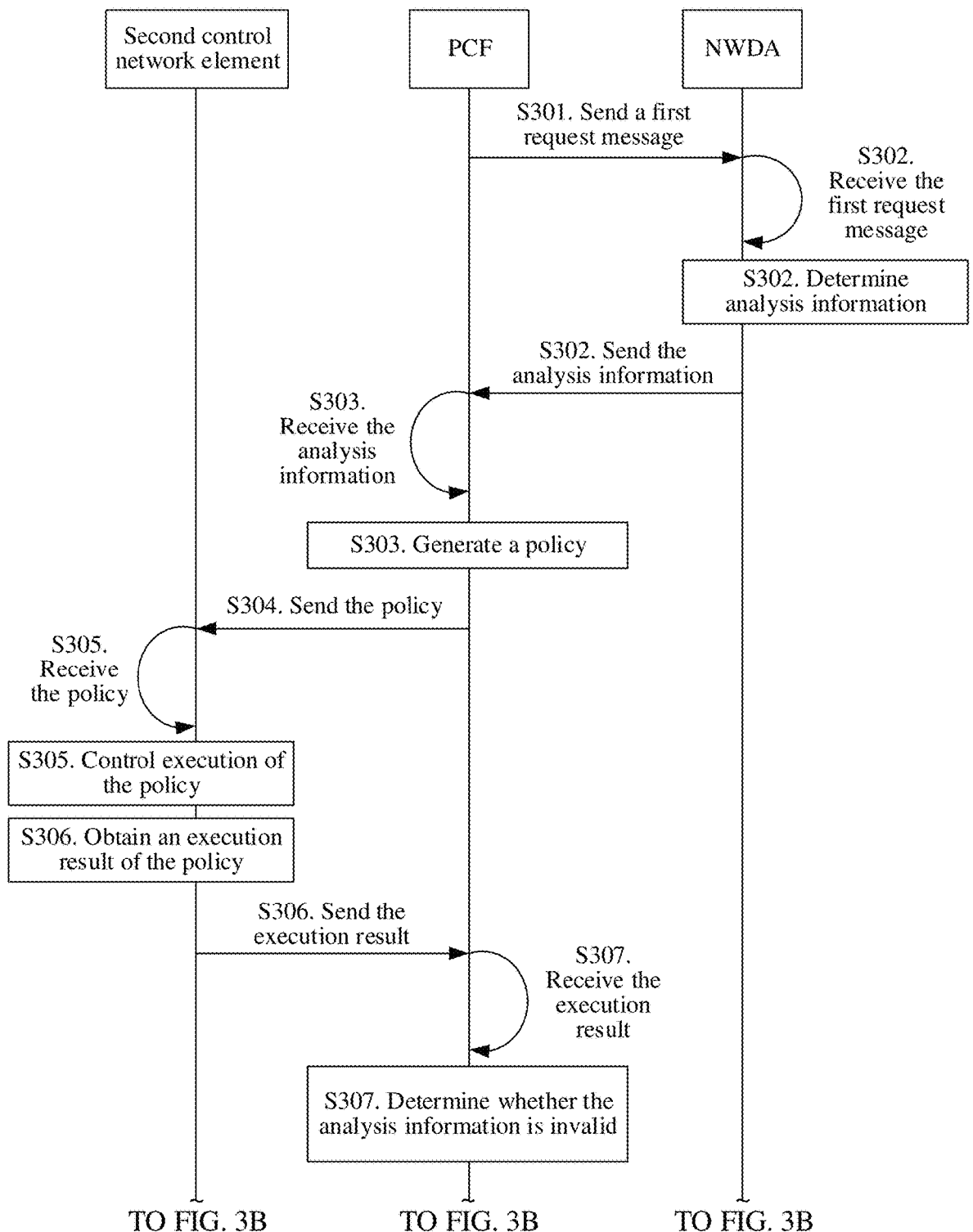
FIG. 3A and FIG. 3B are a schematic flowchart of a communication method according to an embodiment of this application.
Figure 3B:
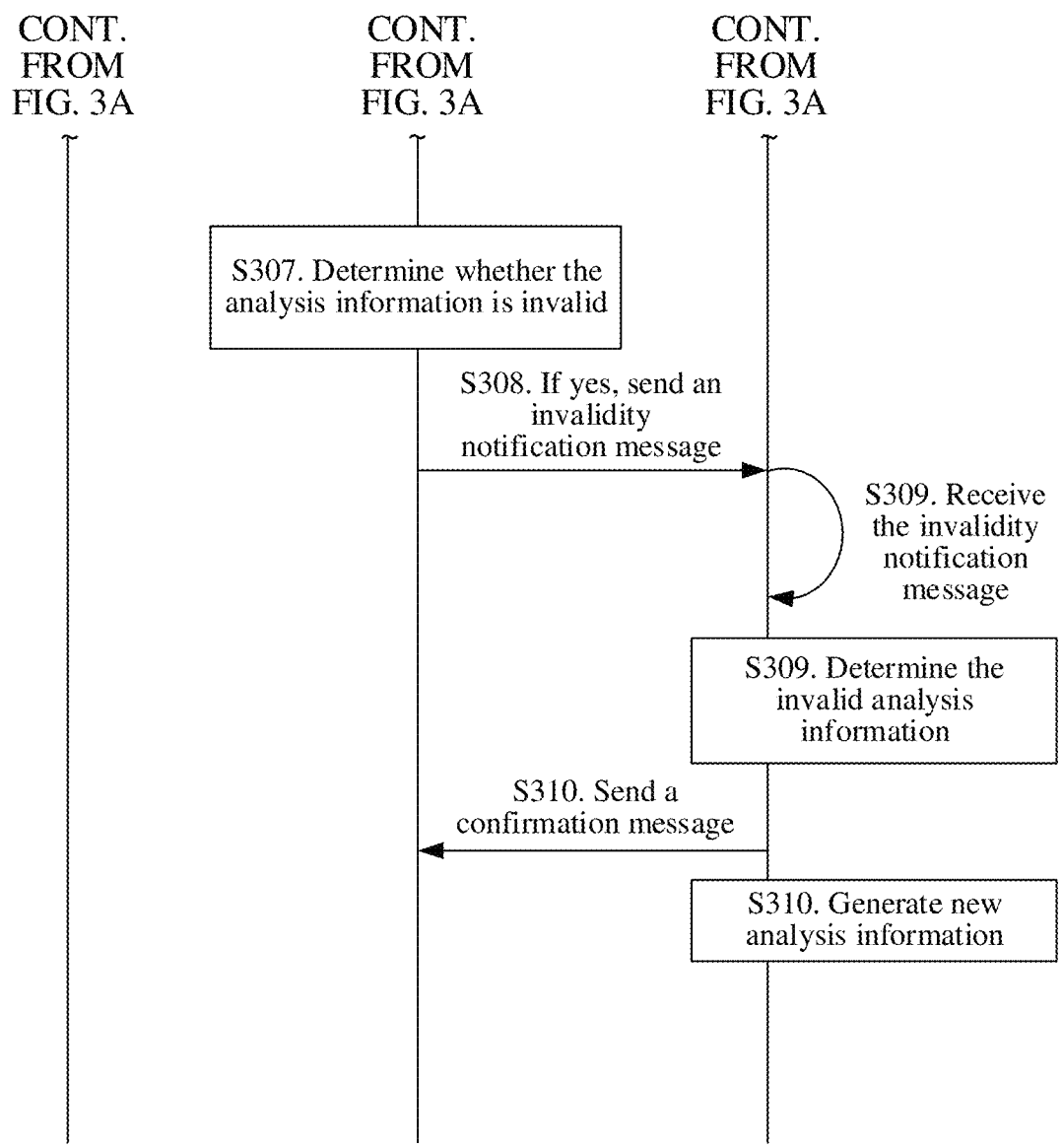

FIG. 3A and FIG. 3B is a schematic flowchart of a communication method according to an embodiment of this application. As shown in FIG. 3A and FIG. 3B, the method includes at least the following operations.

Operation S301: A first control network element PCF sends a first request message to an NWDA, where the first request message is used to request analysis information.

In one embodiment, the PCF sends the first request message to the NWDA, where the first request message is used to request the analysis information from the NWDA. The first request message may carry a type of the analysis information, and the type of the analysis information includes at least one of user analysis information, network slice analysis information, analysis information related to an operator specific service, or session analysis information.

The first request message may carry indication information, and the indication information is used to indicate the type of the analysis information. Specifically, in one embodiment, the indication information indicates the type of the analysis information by using one or more pieces of bit information. For example, when the bit information is "00", a corresponding type of the analysis information is user analysis information; when the bit information is "01", a corresponding type of the analysis information is network slice analysis information; when bit information is "10", a corresponding type of the analysis information is analysis information related to an operator specific service; and when the bit information is "11", a corresponding type of the analysis information is session analysis information. In another embodiment, the indication information indicates the type of the analysis information by using identification information. For example, when the identification information in the indication information is a UE ID or a UE group ID, a corresponding type of the analysis information is user analysis information; when the identification information in the indication information is a slice ID, a corresponding type of the analysis information is network slice analysis information; when the identification information in the indication information is an analytic ID, a corresponding type of the analysis information is analysis information related to an operator specific service; and when the identification information in the indication information is a session ID, a corresponding type of the analysis information is session analysis information. The bit information or the identification information is merely an example, and the indication information may alternatively indicate the type of the analysis information by using bit information in another form or identification information in another form.

Further, the first request message may further include a request parameter corresponding to the analysis information. Specifically, when the first request message is used to request user analysis information, the first request message may include a user request parameter corresponding to the user analysis information. For example, if the first request message is used to request a list of cells in which UE is usually located, the request parameter may be a specific time, and is intended to request a list of cells in which the UE is usually located in the specific time; if the first request message is used to request statistics about a CM-connected status of UE, the request parameter may be a specific time, and is intended to learn whether the UE is frequently in a CM-connected state in the specific time; and when the first request message is used to request network slice request information, the first request message may include a network slice request parameter corresponding to the network slice request information. For example, the network slice request parameter is used to request a congestion status of a network slice, or the like.

The first request message may be a subscription request message. The subscription request message may specifically indicate a manner in which the NWDA sends analysis information to the PCF, for example, used to instruct the NWDA to periodically send the analysis information to the PCF or send the analysis information to the PCF based on event triggering. Alternatively, the first request message may be a request that is in another form and that includes the foregoing information. A form of the first request message is not specifically limited herein.

For example, information carried in the first request message may include a slice ID and indication information of slice congestion information (SCI). The information carried in the first request message may further include a sending period (periodicity) or an SCI threshold. The slice ID is used to indicate a network slice identifier of network slice information specific to the analysis information requested by the PCF. The SCI is used to indicate a request parameter corresponding to the analysis information, that is, the PCF requests analysis information that corresponds to a slice congestion degree. The sending period or the SCI threshold is used to indicate a form in which the PCF instructs the NWDA to send the analysis information. If the first request message includes a sending period, it indicates that the PCF instructs the NWDA to periodically feed back the analysis information based on the sending period. If the first request message includes an SCI threshold, it indicates that the PCF instructs the NWDA to feed back the analysis information to the PCF when the SCI reaches the SCI threshold. If the information carried in the first request message includes neither the sending period nor the SCI threshold, after receiving the first request message, the NWDA may send, to the PCF in real time, the analysis information requested by using the first request message.

For another example, the information carried in the first request message may include a UE ID, an indication parameter of a list of cells in which a user is usually located, and the like. The UE ID is used to indicate a user equipment identifier of UE specific to the PCF. The indication parameter of the list of cells in which the user is usually located is used to indicate that the analysis information that the PCF instructs the NWDA to send is the list of cells in which the UE is usually located. The information carried in the first request message may further include indication information of a sending manner, used to instruct the NWDA to feed back the analysis information in real time, feed back the analysis information according to a preset time period, feed back the analysis information based on an event, or the like. If the information carried in the first request message includes a UE group ID, it indicates that the PCF requests analysis information specific to a group of UEs, and an identifier of the group of UEs is the UE group ID.

Operation S302: The NWDA receives the first request message, determines the analysis information based on the first request message, and sends the analysis information to the PCF.

In one embodiment, when receiving the first request message, the NWDA may determine the analysis information based on the information carried in the first request message. For example, when the first request message carries a UE ID, it indicates that the analysis information that needs to be determined by the NWDA is specific to UE corresponding to the UE ID. When the first request message carries an indication parameter of a list of cells in which a user is usually located, it indicates that the analysis information determined by the NWDA is the list of cells in which the UE is usually located. For another example, if the first request message carries a slice ID, it indicates that the analysis information determined by the NWDA is specific to a network slice corresponding to the slice ID. If the first request message carries SCI, the NWDA can determine that the PCF needs a congestion status of the network slice. The NWDA may determine the congestion status of the network slice based on an analysis model corresponding to the network slice and user equipment currently accommodated in the network slice, and send the congestion status to the PCF as the analysis information.

When establishing the analysis model, the NWDA may establish the model based on collected big data. For example, when establishing an analysis model for a list of cells in which UE is usually located, the NWDA may collect statistics on location data of the UE in a period (in one week or one day), determine, based on the location data, a cell in which the UE is located, and determine, based on collected big data, the analysis model of the list of cells in which the UE is usually located. Specifically, the NWDA collects statistics on information about all cells in which the UE is located in a time period. If a cell appears for a relatively large quantity of times, the cell may be added to a list of cells that corresponds to the time period and in which the UE is usually located. The analysis model established by the NWDA for the above case may be a correspondence between a time period and a list of cells in which the UE is usually located. When receiving the first request message from the PCF, the NWDA may determine, based on a time period carried in the first request message, a list of cells that corresponds to the time period and in which the UE is usually located. For another example, when setting up a congestion status of a network slice, the NWDA may collect statistics on network service quality of the network slice when the network slice accommodates a specific quantity of UEs. A correspondence between a quantity of UEs in the network slice and a congestion status is determined by using collected big data, and the correspondence may be the analysis model that is for the congestion status of the network slice and that is established by the NWDA. When receiving the first request message from the PCF, the NWDA may determine, based on the first request message, a quantity of UEs currently accommodated in the network slice, determine a corresponding congestion status (such as congested, normal, or idle) based on the quantity of the currently accommodated UEs, and send the congestion status as the analysis information to the PCF. In one embodiment, the NWDA may alternatively determine a corresponding network slice based on a network slice identifier carried in the first request message, and obtain, for analysis, a status of UEs currently accommodated in the network slice.

The MWDA may send a message carrying the analysis information, for example, may send a response message, a confirmation message, or a notification message that carries the analysis information, or a message that is in another form and that carries the analysis information. This is not specifically limited herein. For example, if the first request message is a subscription request message, correspondingly, the message carrying the analysis information is a confirmation message for the subscription request; if the NWDA feeds back the analysis information to the PCF in real time after receiving the first request message from the PCF, the message carrying the analysis information is a response message; or if the NWDA periodically feeds back the analysis information to the PCF after receiving the first request message from the PCF, the message carrying the analysis information is a notification message.

The NWDA may send the analysis information in the manner of sending the analysis information that is indicated in the first request message. For example, if the manner of sending the analysis information that is indicated in the first request message is instructing the NWDA to periodically send the analysis information to the PCF, the NWDA periodically sends the analysis information to the PCF. For another example, if the manner of sending the analysis information that is indicated in the first request message is instructing the NWDA to send the analysis information to the PCF based on event triggering, the NWDA may send the analysis information to the PCF after the analysis information is updated or after the analysis information is obtained by establishing an analysis model. Alternatively, after receiving the first request message, the NWDA may send the analysis information to the PCF in real time. The analysis information may also include same indication information as the first request message, used to indicate that the analysis information is user analysis information or network slice analysis information. For example, the indication information in the analysis information may include a UE ID, a slice ID, an analytic ID, or the like.

It should be noted that operation S301 and operation S302 are example embodiments. To be specific, in one case, after the PCF sends the first request message to the NWDA, the NWDA sends the analysis information based on the first request message; and in another case, the PCF does not need to send the first request message to the NWDA, and the NWDA may send the analysis information to the PCF based on a preset trigger condition. For example, the NWDA may send the analysis information to the PCF after establishing an analysis model. This is not limited herein.

Operation S303: The PCF receives the analysis information, and generates a policy corresponding to the analysis information.

In one embodiment, the PCF can receive the analysis information, and can generate the policy corresponding to the analysis information. For example, the first request message sent by the PCF is used to request a congestion status of a network slice, and when the analysis information that is fed back by the NWDA and that is received by the PCF is that the congestion status of the network slice is congested, the policy correspondingly generated by the PCF is reducing quality of service (QoS) of the network slice. When the analysis information that is fed back by the NWDA and that is received by the PCF is that the congestion status of the network slice is idle, the policy correspondingly generated by the PCF is improving QoS of the network slice. For another example, the first request message sent by the PCF is used to request a CM-connected status of UE in a specific time. If the analysis information that is fed back by the NWDA and that is received by the PCF is that the UE is in a CM-connected state in the specific time, the policy that may be generated by the PCF based on the analysis information is establishing a pre-connection between the UE and the network at a time before the specific time. For another example, the first request message sent by the PCF is used to request a list of cells in which UE is usually located in a specific time. If the analysis information that is fed back by the NWDA and that is received by the PCF is the list of cells in which the UE is usually located in the specific time, the policy correspondingly generated by the PCF may be paging the UE based on the list of cells in which the UE is usually located.

In one embodiment, the PCF may further generate another policy based on the analysis information of the NWDA, for example, pushing a message to one UE or a group of UEs, or controlling one UE or a group of UEs to be in a sleep state in a time period. The PCF may further specify a policy for a session or an operator specific service. This is not specifically limited in this embodiment of this application.

Operation S304: The PCF sends the policy to a second control network element.

In one embodiment, after generating the policy, the PCF may determine the second control network element of the policy, and may send the policy to the second control network element. The second control network element may be an AMF or an SMF.

Operation S305: The second control network element receives the policy, and controls execution of the policy.

In one embodiment, the second control network element, for example, the AMF or the SMF, controls the execution of the policy. The second control network element may first receive the policy. The controlling, by the second control network element, execution of the policy may include any one of the following embodiments: The second control network element executes the policy, for example, the AMF or the SMF independently executes the policy, or the AMF and the SMF cooperatively execute the policy. Alternatively, the second control network element delivers the policy to an execution network element, for example, delivers the policy to one or more execution network elements of a UPF, UE, or an (R)AN to execute the policy. The policy may be executed cooperatively by a plurality of execution network elements, or may be executed by one execution network element. After the policy is executed, the second control network element may learn of an execution result. The execution result may include successful execution or failed execution.

The following describes, by using an example, a case in which the policy execution succeeds or fails.

It is assumed that the policy formulated by the PCF is adjusting QoS of a network slice. If an execution network element (for example, a base station) related to the network slice correspondingly succeeds in adjusting the QoS of the network slice, the execution result indicates successful execution. If an execution network element does not have a capability of correspondingly adjusting the QoS, the execution result indicates failed execution. It is assumed that the policy formulated by the PCF is establishing a pre-connection between UE and a network in a time period. If the UE and the network successfully establish the pre-connection in the time period, the execution result indicates successful execution. If the UE and the network fail to establish the pre-connection in the time period, the execution result indicates failed execution. It is assumed that the policy formulated by the PCF is paging UE based on a list of cells in which UE is usually located. If the UE is successfully paged in the list of cells in which the UE is usually located, the execution result indicates successful execution. If the UE fails to be paged in the list of cells in which the UE is usually located, the execution result indicates failed execution.

Operation S306: The second control network element obtains the execution result of the policy, and sends the execution result to the PCF.

In one embodiment, after controlling execution of the policy, the second control network element may learn of the execution result of the policy, and may further feed back the execution result to the PCF. A manner of feeding back the execution result by the second control network element to the PCF may be indicated by the PCF. For example, when sending the policy to the second control network element, the PCF may further send indication information to indicate the manner of feeding back the execution result by the second control network element. The manner of feeding back the execution result by the second control network element may alternatively be preconfigured, dynamically determined, or known by both the second control network element and the PCF. For example, the manner of feeding back the execution result by the second control network element is dynamically determined. In one embodiment, the manner of feeding back the execution result by the second control network element corresponds to the executed policy, and the manner of feeding back the execution result may correspond to a type of the executed policy, or may correspond to content of the executed policy. For example, when the second control network element controls execution of a real-time policy, that is, the policy is valid only for this execution process, the second control network element feeds back an execution result in a first manner. The first manner may be feeding back the execution result in real time. When the second control network element controls execution of a periodic policy, or controls execution of a policy that is valid in a time period, the second control network element feeds back an execution result in a second manner. The second manner may be periodically sending the execution result. In a third manner, the second control network element may send an execution result when the execution result obtained by the second control network element reaches a threshold. For another example, when controlling execution of a policy for a device or an operator specific service, the second control network element feeds back an execution result in a manner; when controlling and executing a policy for a network slice, the second control network element feeds back an execution result in another manner, and so on.

In one embodiment, the execution result sent by the second control network element includes only successful execution, or includes only failed execution, or may include both successful execution and failed execution. To be specific, when sending the execution result, the second control network element sends only the execution result indicating that the execution succeeds, the second control network element sends only the execution result indicating that the execution fails, or the second control network element sends the obtained execution result to the PCF regardless of whether the execution succeeds or fails.

Operation S307: The PCF receives the execution result, and determines, based on the execution result, whether the analysis information is invalid.

In one embodiment, after receiving execution result, the PCF may count the execution result, and may determine, based on the counted execution result, whether to send an invalidity notification message for the analysis information to the NWDA. Specifically, the PCF may count a quantity of execution failures in the execution result, and determine whether the quantity of execution failures reaches a first threshold. If the quantity of execution failures reaches the first threshold, it indicates that the analysis information received by the PCF is invalid, and it is determined that the invalidity notification message for the analysis information needs to be sent to the NWDA. Alternatively, the PCF may count a hit rate of the execution result. If the hit rate of the execution result is less than a second threshold, the analysis information received by the PCF is invalid, and it is determined that the invalidity notification message for the analysis information needs to be sent to the NWDA. Certainly, the PCF may determine the execution result in another manner, which is not exhaustively described herein. Some specific examples of this operation are described in detail in the following method embodiments.

Operation S308: If determining that the analysis information is invalid, the PCF sends the invalidity notification message for the analysis information to the NWDA.

In one embodiment, if determining that the analysis information is invalid, the PCF sends the invalidity notification message for the analysis information to the NWDA. Specifically, the PCF needs to indicate the corresponding analysis information in the invalidity notification message, to notify the NWDA of the specific invalid analysis information. The PCF may notify the NWDA of the specific invalid analysis information in any one of the following manners.

(1) When the PCF receives a message that carries the analysis information and that is from the NWDA, the message may further carry a message identifier (message ID) corresponding to the analysis information. The message identifier is used to mark a message that is sent by the NWDA and by using which the PCF receives the analysis information. When determining, based on the execution result, that the analysis information is invalid, the PCF may add the message identifier to the invalidity notification message, so that after receiving the invalidity notification message, the NWDA can determine the specifically sent message by using the message identifier carried in the invalidity notification message, and further can find the analysis information carried in the message. The NWDA can confirm that the analysis information is invalid in the preceding manner.

(2) The invalidity notification message sent by the PCF includes indication information corresponding to the invalid analysis information. The indication information is used to indicate the corresponding analysis information. The NWDA can learn of the invalid analysis information by using the indication information. For example, the NWDA numbers currently generated analysis information. The number may be known by both the PCF and the NWDA, or the NWDA may add the number corresponding to the analysis information to a message for sending the analysis information. After determining that the analysis information is invalid, the PCF may determine the number corresponding to the analysis information. In this case, the indication information of the analysis information that is sent by the PCF may be the number corresponding to the analysis information. When receiving the invalidity notification message, the NWDA may determine the corresponding analysis information based on the number. Certainly, the indication information of the analysis information may further include other information corresponding to the analysis information. This is not specifically limited herein.

An information identifier included in the invalidity notification message in this embodiment of this application may be any one of the message identifier or the indication information described above. This is not limited herein.

(3) The PCF adds the determined invalid analysis information to the invalidity notification message. That is, when receiving the invalidity notification message, the NWDA can learn of the invalid analysis information.

Certainly, the PCF may alternatively notify the NWDA of the specific invalid analysis information by using another method. This is not specifically limited herein.

If the first request message sent by the PCF to request the analysis information is a subscription request, when the PCF determines that the analysis information is invalid, the invalidity notification message sent by the PCF may be a subscription cancellation request corresponding to the subscription request.

In one embodiment, the invalidity notification message sent by the PCF may further carry policy execution related information that is obtained each time the policy fails to be executed. For example, when specific user equipment or a group of specific user equipment performs the policy corresponding to the invalid analysis information, the invalidity notification message carries a UE ID of the specific user equipment or the group of specific user equipment. Further, the invalidity notification message may also carry a slice ID of a network slice in which the specific user equipment or the group of specific user equipment is located. All of the information is fed back to the NWDA, so that the NWDA performs model learning based on the information, and updates the analysis information.

Operation S309: The NWDA receives the invalidity notification message, and determines the invalid analysis information based on the invalidity notification message.

In one embodiment, after receiving the invalidity notification message, the NWDA may determine the invalid analysis information based on the invalidity notification message. For example, the invalid analysis information may be learned of by using the message identifier carried in the invalidity notification message, or the indication information corresponding to the analysis information, or directly by using the invalidity notification message.

Operation S310: The NWDA sends a confirmation message for the invalidity notification message to the PCF, and generates new analysis information.

In one embodiment, after determining the invalid analysis information, the NWDA may send the confirmation message for the invalidity notification message to the PCF, to indicate that the NWDA has learned of the invalid analysis information. The confirmation message may carry a cooling time corresponding to the analysis information, and the cooling time is used to indicate duration used by the NWDA to update the analysis information. The NWDA sends the cooling time to the PCF, to instruct the PCF not to request the analysis information within the cooling time, and notify the PCF that the analysis information has become invalid and new analysis information is being generated. The NWDA may generate the new analysis information while sending the confirmation message. Certainly, the NWDA may alternatively generate the new analysis information after sending the confirmation message. This is not specifically limited herein.

The NWDA may send the new analysis information to the PCF based on a request message that is for the new analysis information and that is resent by the PCF to the NWDA. Alternatively, the NWDA directly sends the new analysis information to the PCF after generating the new analysis information. Alternatively, the NWDA may send the analysis information to the PCF based on event triggering. For example, when the invalidity notification message sent by the PCF to the NWDA is a subscription cancellation request, if the PCF needs to generate a policy based on the analysis information, the PCF needs to resend a subscription request or send another request for the analysis information. For another example, if the confirmation message that is for the invalidity notification message and that is sent by the NWDA to the PCF does not carry the cooling time, after the NWDA generates the new analysis information, the NWDA may directly send the new analysis information to the PCF.

The NWDA may update an analysis result based on information that is related to the execution result and that is fed back by the PCF. Alternatively, after determining that the analysis information is invalid, the NWDA may continue to collect data related to the analysis information, to establish a new model, thereby generating the new analysis information. A specific manner of generating the new analysis information by the NWDA is not specifically limited in this embodiment of this application.

In one embodiment, if the NWDA provides the analysis information to another PCF for decision making, when receiving the invalidity notification message that is sent by the PCF and that is for the analysis information, the NWDA further needs to notify the another PCF that the analysis information has become invalid. Further, when the NWDA sends the invalidity notification message for the analysis information to the another PCF, the invalidity notification message may include the cooling time of the analysis information, to notify the another PCF that the analysis information has become invalid within the cooling time and new analysis information needs to be generated. In this way, the another PCF may request the new analysis information from the PCF after the cooling time.

In this embodiment of this application, the PCF receives the analysis information of the NWDA, and can generate the policy based on the analysis information. In addition, the PCF can learn of the execution result of the policy, and can determine, based on the execution result, whether to send the invalidity notification message for the analysis information to the NWDA, that is, can determine, based on the execution result, whether the analysis information is invalid.

The following provides some specific embodiments in which the PCF determines to send the invalidity notification message to the NWDA.

Figure 4A:
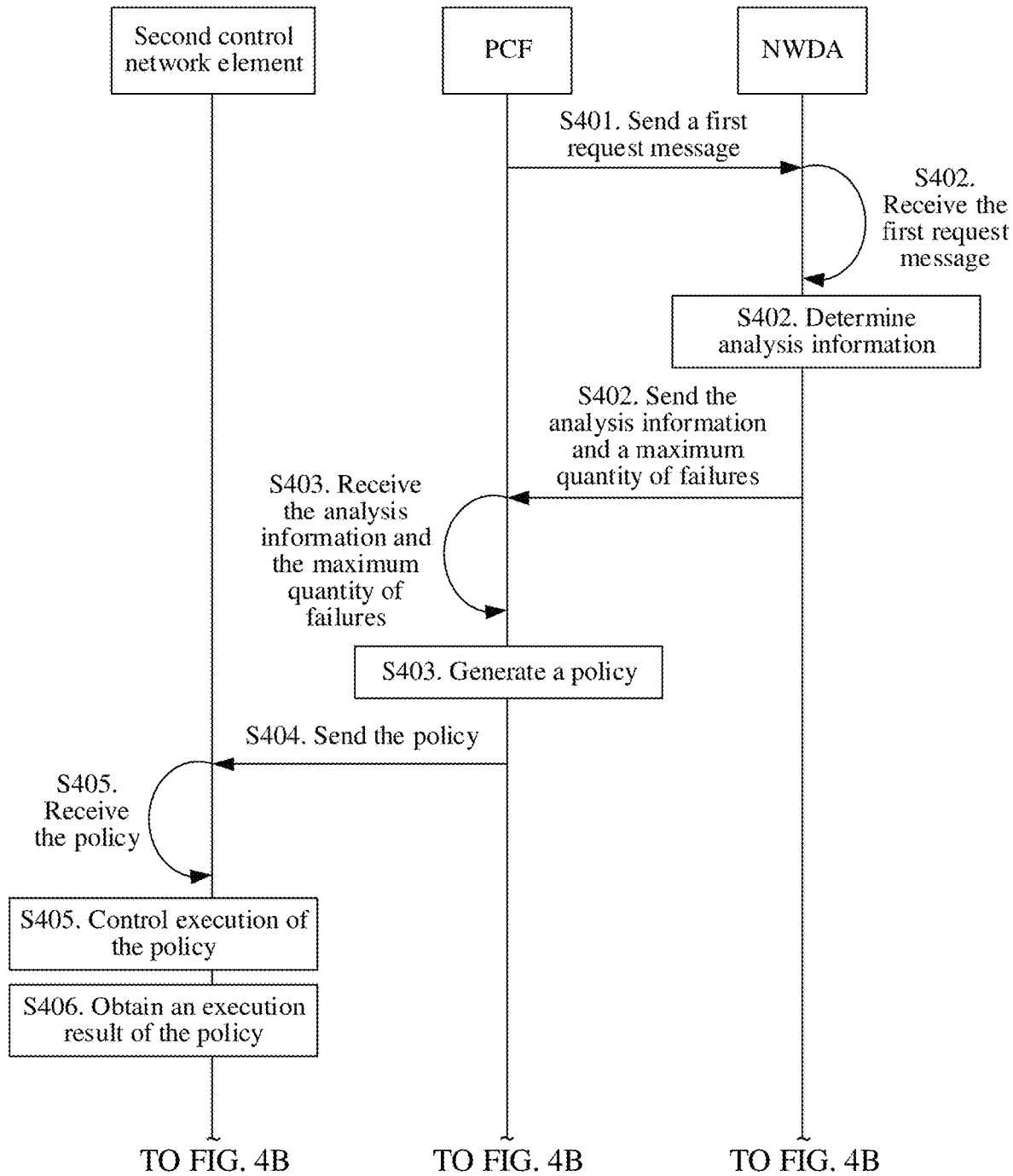
FIG. 4A and FIG. 4B are a schematic flowchart of another communications method according to an embodiment of this application.
Figure 4B:
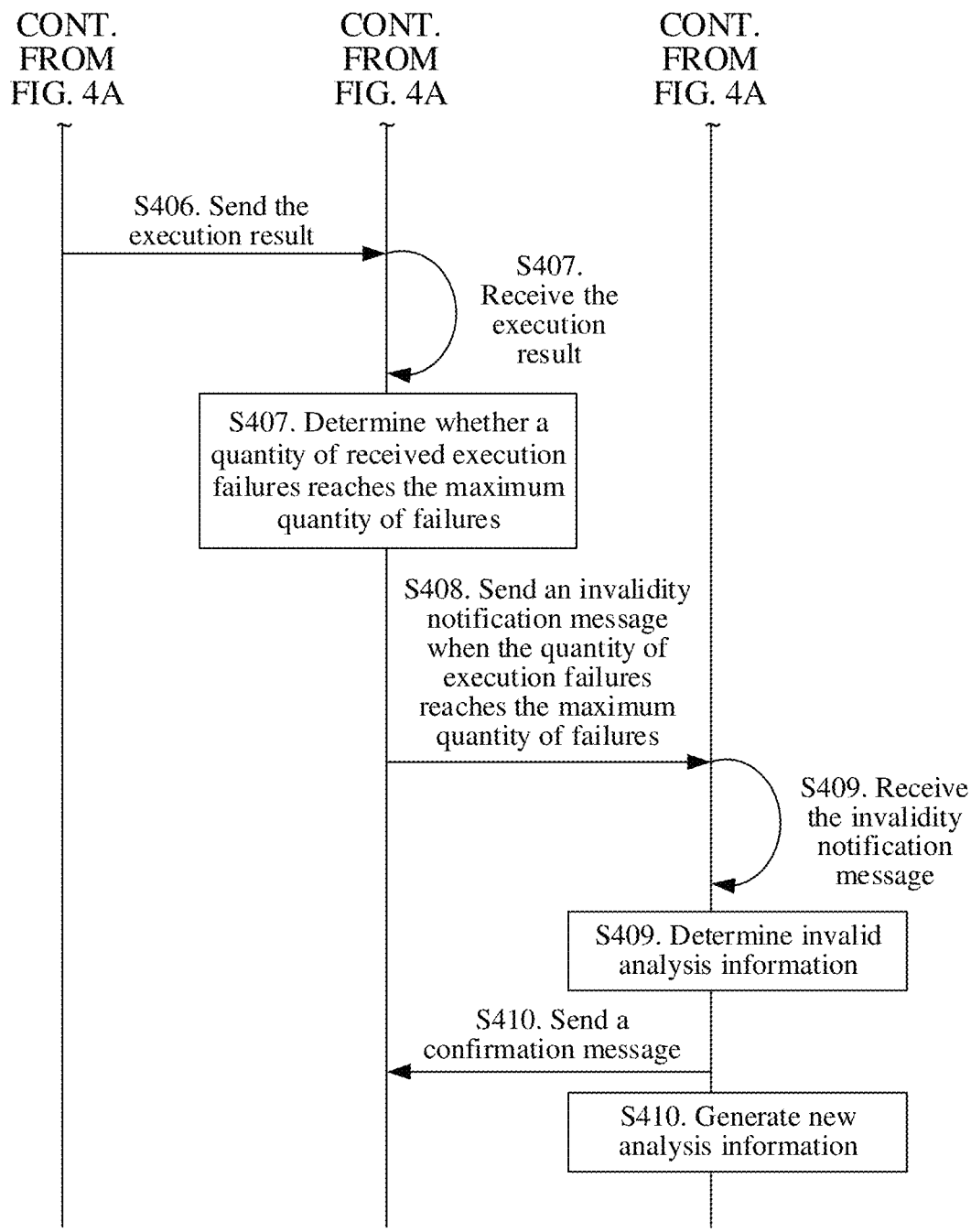

FIG. 4A and FIG. 4B are a schematic flowchart of another communication method according to an embodiment of this application. As shown in FIG. 4A and FIG. 4B, the method includes at least the following operations.

Operation S401: A PCF sends a first request message to an NWDA, where the first request message is used to request analysis information from the NWDA.

Operation S402: The NWDA receives the first request message, determines the analysis information based on the first request message, and sends the analysis information and a maximum quantity of failures for the analysis information to the PCF.

Operation S403: The PCF receives the analysis information and the maximum quantity of failures, and generates a policy corresponding to the analysis information.

Operation S404: The PCF sends the policy to a second control network element.

Operation S405: The second control network element receives the policy, and controls execution of the policy.

Operation S406: The second control network element obtains an execution result of the policy, and sends the execution result to the PCF.

Operation S407: The PCF receives the execution result, and determines whether a quantity of received execution failures in the received execution result reaches the maximum quantity of failures.

Operation S408: When determining that the quantity of received execution failures reaches the maximum quantity of failures, the PCF determines that the analysis information is invalid, and sends an invalidity notification message for the analysis information to the NWDA.

Operation S409: The NWDA receives the invalidity notification message, and determines the invalid analysis information based on the invalidity notification message.

Operation S410: The NWDA sends a confirmation message for the invalidity notification message to the PCF, and generates new analysis information.

In one embodiment, when establishing an analysis model of the analysis information, the NWDA may determine a case in which the analysis model becomes invalid. For example, when the NWDA determines the maximum quantity of failures, after the policy generated based on the analysis information in the analysis model is executed, if a quantity of execution failures exceeds the maximum quantity of failures, it indicates that the analysis model becomes invalid, and the analysis model needs to be updated, to generate new analysis information. Certainly, the NWDA may alternatively determine another invalidity threshold. This is not specifically limited in this embodiment of this application.

In one embodiment, the NWDA may add, to a message for sending the analysis information, the maximum quantity of failures for the analysis information. After receiving the analysis information, the PCF may generate the policy based on the analysis information, and may send the policy to the second control network element. The second control network element can control the execution of the policy, and may learn of the execution result of the policy. The second control network element can further send the execution result to the PCF. Specifically, each time after learning of an execution result, the second control network element may send the execution result to the PCF, and the PCF determines whether an accumulated quantity of execution results that indicate execution failures reaches the maximum quantity of failures. Alternatively, the second control network element sends only an execution result indicating an execution failure to the PCF, and all execution results received by the PCF indicate execution failures. In this case, the PCF may determine, depending on whether a quantity of received execution results reaches the maximum quantity of failures, whether the analysis information is invalid. A manner of sending the execution result by the second control network element may be pre-configured, or may be indicated by the PCF. This is not specifically limited herein.

Further, the PCF may alternatively count the quantity of received execution failures in a preset time period. If the quantity of received execution failures in the preset time period does not reach the maximum quantity of failures, the PCF determines that the analysis information does not become invalid. If the quantity of received execution failures in the preset time period reaches the maximum quantity of failures, the PCF determines that the analysis information becomes invalid. The preset time period may be known by both the PCF and the NWDA, or may be pre-configured, or may be indicated by the NWDA. This is not specifically limited herein.

For an execution manner of another operation in this embodiment of this application, refer to the foregoing method embodiment. Details are not described herein again.

Figure 5A:
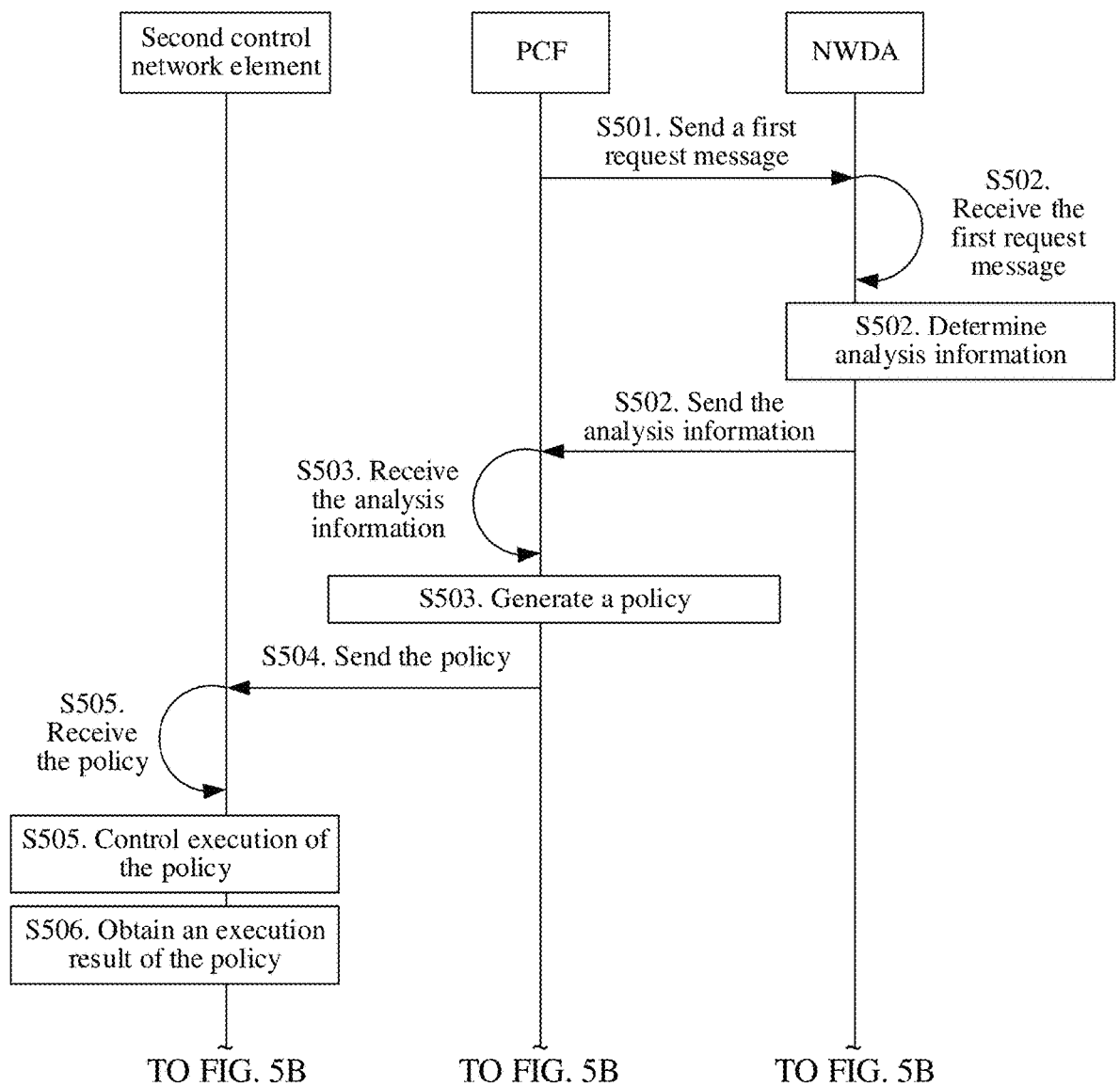
FIG. 5A and FIG. 5B are a schematic flowchart of still another communication method according to an embodiment of this application.
Figure 5B:
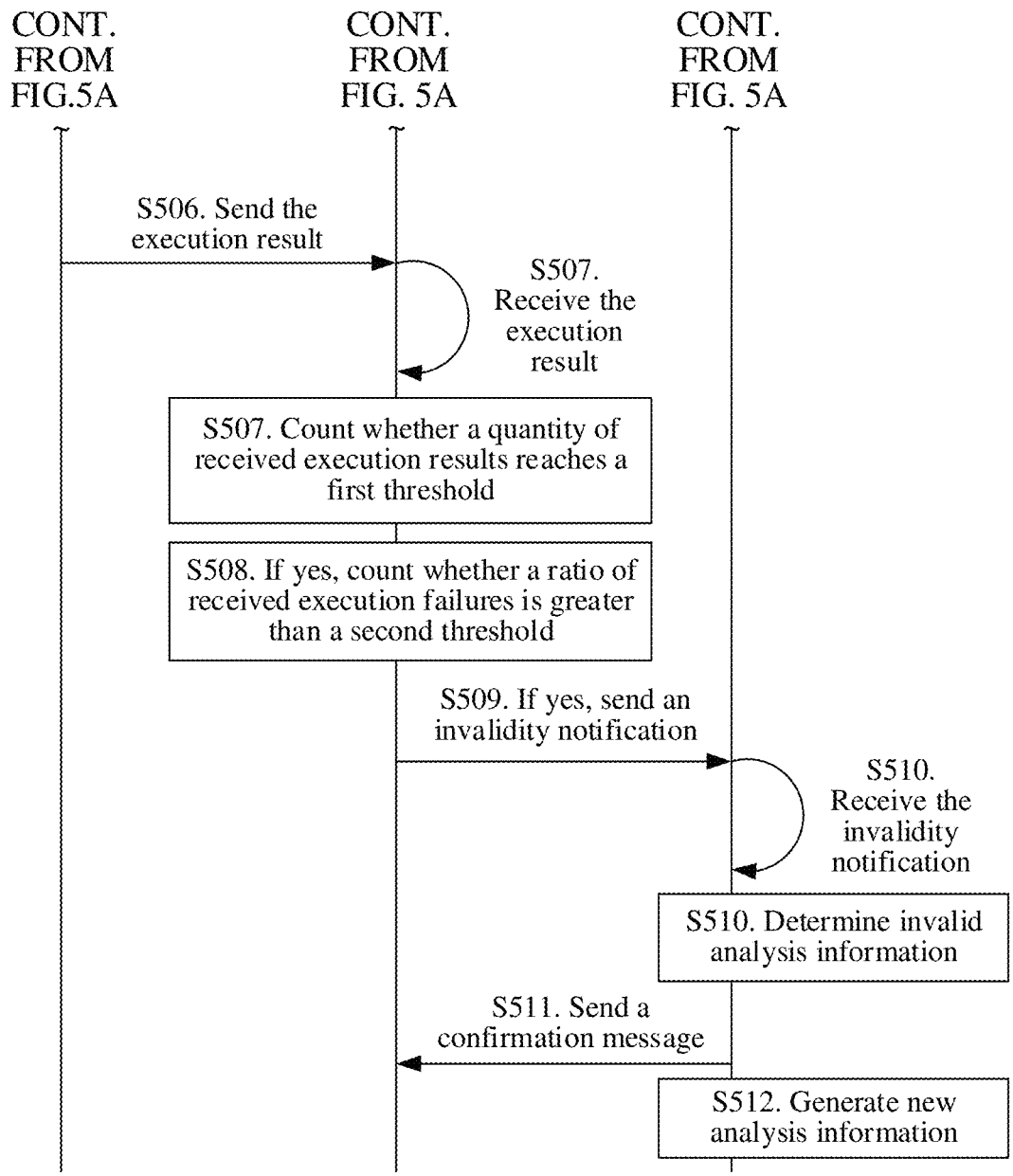

FIG. 5A and FIG. 5B are a schematic flowchart of still another communication method according to an embodiment of this application. As shown in FIG. 5A and FIG. 5B, the method includes at least the following operations.

Operation S501: A PCF sends a first request message to an NWDA, where the first request message is used to request analysis information from the NWDA.

Operation S502: The NWDA receives the first request message, determines the analysis information based on the first request message, and sends the analysis information to the PCF.

Operation S503: The PCF receives the analysis information, and generates a policy corresponding to the analysis information.

Operation S504: The PCF sends the policy to a second control network element.

Operation S505: The second control network element receives the policy, and controls execution of the policy.

Operation S506: The second control network element obtains an execution result of the policy, and sends the execution result to the PCF.

Operation S507: The PCF receives the execution result, and counts whether a quantity of received execution results reaches a second threshold.

Operation S508: If yes, the PCF counts whether a percentage of a quantity of execution failures that are in the received execution result in an execution quantity is greater than a first threshold.

Operation S509: If yes, the PCF determines that the analysis information is invalid, and sends an invalidity notification message for the analysis information to the NWDA.

Operation S510: The NWDA receives the invalidity notification message, and determines the invalid analysis information based on the invalidity notification message.

Operation S511: The NWDA sends a confirmation message for the invalidity notification message to the PCF, and updates the invalid analysis information.

In one embodiment, the sending, by the second control network element, the execution result to the PCF may be sending, each time the second control network element learns of an execution result, the execution result to the PCF. The PCF first counts whether the quantity of received execution results meets the second threshold. If the quantity meets the second threshold, the PCF then determines a percentage of execution failures or execution successes in the execution result. Further, an execution miss rate or an execution hit rate of the policy can be determined. In this way, a determining result of the PCF can be prevented from being affected by a small quantity of execution results. If the PCF determines that the execution miss rate of the policy is higher than the first threshold, it indicates that the quantity of execution failures of the policy is relatively large, and it is determined that the corresponding analysis information is invalid. The first threshold may be pre-configured. That is, if a percentage of a quantity of execution failures of each policy reaches the first threshold, it indicates that analysis information corresponding to the policy is invalid. Alternatively, the second threshold may be determined based on specific analysis information, or the second threshold may be determined by the PCF, or may be determined by the NWDA and delivered to the PCF. This is not limited herein. For example, some analysis information has relatively high tolerance on an execution result, and allows a relatively high miss rate, and therefore, the first threshold is configured relatively high. Some other analysis information has low tolerance on an execution result, and therefore, the first threshold is configured relatively low. That is, the analysis information corresponds to the first threshold. Certainly, the first threshold may alternatively be determined in another manner. This is not specifically limited herein.

For an execution manner of another operation in this embodiment of this application, refer to the foregoing method embodiment. Details are not described herein again.

Figure 6:
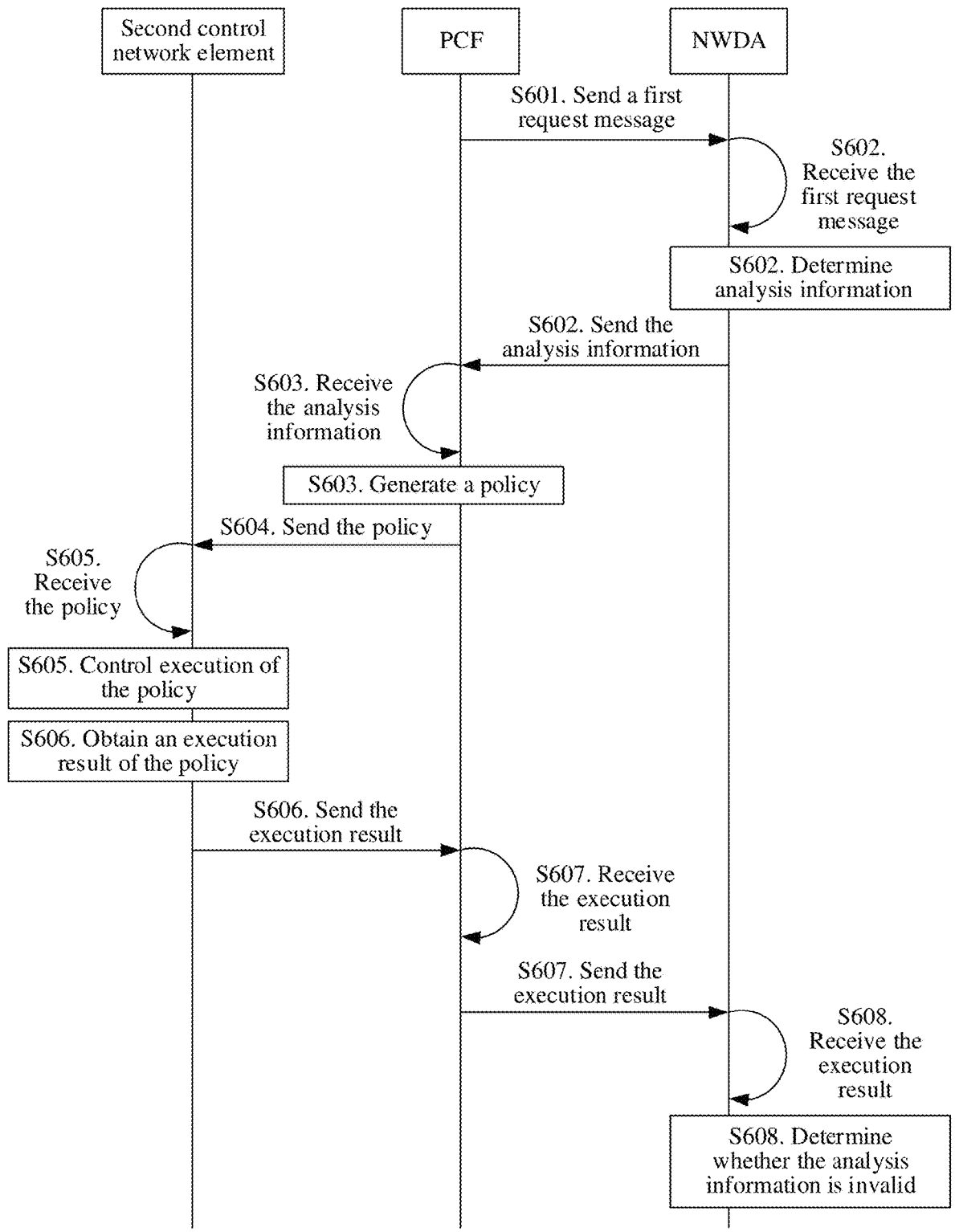
FIG. 6 is a schematic flowchart of still another communication method according to an embodiment of this application.

The embodiments of this application further provide some examples in which the NWDA determines whether the analysis information is invalid. FIG. 6 is a schematic flowchart of still another communication method according to an embodiment of this application. As shown in FIG. 6, the method includes at least the following operations.

Operation S601: A PCF sends a first request message to an NWDA, where the first request message is used to request analysis information from the NWDA.

Operation S602: The NWDA receives the first request message, determines the analysis information based on the first request message, and sends the analysis information to the PCF.

Operation S603: The PCF receives the analysis information, and generates a policy corresponding to the analysis information.

Operation S604: The PCF sends the policy to a second control network element.

Operation S605: The second control network element receives the policy, and controls execution of the policy.

Operation S606: The second control network element obtains an execution result of the policy, and sends the execution result to the PCF.

Operation S607: The PCF receives the execution result, and sends the received execution result to the NWDA.

Operation S608: The NWDA receives the execution result, and determines, based on the execution result, whether the analysis information is invalid.

In one embodiment, after receiving the execution result, the PCF may send the execution result to the NWDA, and the NWDA determines whether the analysis information is invalid. Specifically, after receiving the execution result, the PCF may directly send the execution result to the NWDA. Alternatively, after receiving the execution result, the PCF may send a notification to the NWDA, and after receiving a request that is for the execution result and that is sent by the NWDA, the PCF sends the execution result to the NWDA. Alternatively, the PCF may send the execution result at a time point indicated in advance by the NWDA. For a manner of determining, by the NWDA after receiving the execution result, whether the analysis information is invalid, refer to a determining manner of the PCF. Details are not described herein again.

In one embodiment, after determining that the analysis information is invalid, the NWDA may generate new analysis information in time, and may further send the new analysis information to the PCF. Further, after generating the new analysis information, the NWDA may notify the PCF that the new analysis information has been generated, or send the new analysis information to the PCF after receiving a request message that is sent by the PCF and that is for the analysis information.

For specific examples of the foregoing operations in this embodiment of this application, refer to related descriptions in the foregoing method embodiments. Details are not described herein again.

Figure 7:
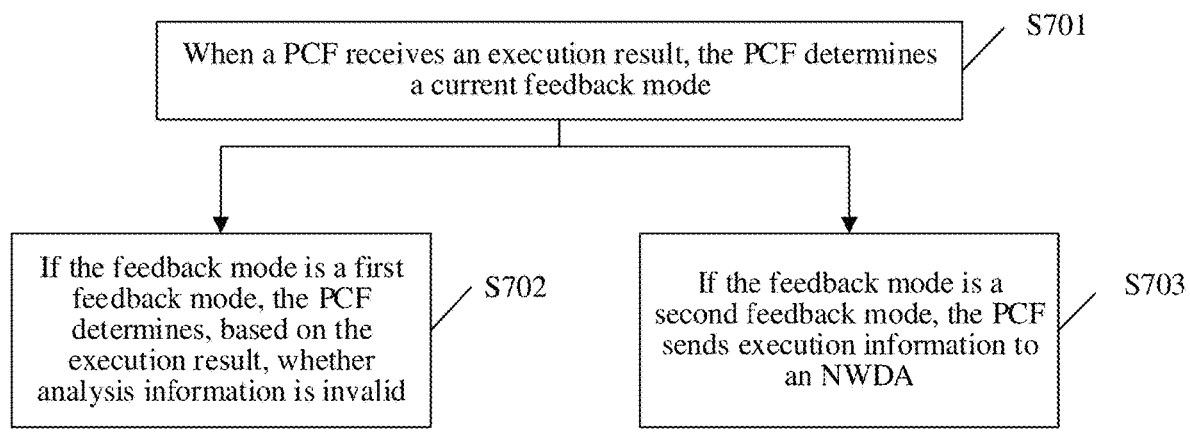
FIG. 7 is a schematic flowchart of still another communication method according to an embodiment of this application.

The embodiments of this application further provide some specific examples in which the PCF or the NWDA can determine, based on an actual situation in a system, whether the analysis information is invalid. FIG. 7 is a schematic flowchart of still another communication method according to an embodiment of this application. As shown in FIG. 7, the method includes at least the following operations.

Operation S701: When a PCF receives an execution result, the PCF determines a current feedback mode.

Operation S702: If the feedback mode is a first feedback mode, the PCF determines, based on the execution result, whether analysis information is invalid.

Operation S703: If the feedback mode is a second feedback mode, the PCF sends execution information to an NWDA, and the NWDA is configured to determine, based on the execution result, whether the analysis information is invalid.

In one embodiment, after receiving the execution result fed back by a second control network element, the PCF may determine the current feedback mode of the PCF. The feedback mode may include the first feedback mode and the second feedback mode. In the first feedback mode, the PCF determines whether the analysis information is invalid. In the second feedback mode, the NWDA determines whether the analysis information is invalid. The current feedback mode of the PCF may be pre-configured, or may be dynamically determined. For example, the PCF may receive indication information from the NWDA, where the indication information is used to indicate a feedback mode of the PCF. The PCF may switch the feedback mode based on the indication mode. If the PCF determines that the current feedback mode is the first feedback mode, after determining, based on the execution result, whether the analysis information is invalid, the PCF sends an invalidity notification message to the NWDA. If the PCF determines that the current feedback mode is the second feedback mode, the PCF may send the execution result to the NWDA. For a manner of sending the execution result by the PCF to the NWDA, refer to the manner of sending the execution result by the second control network element to the PCF.

For specific examples of the operations in this embodiment of this application, refer to related descriptions in the foregoing method embodiments. Details are not described herein again.

It can be learned that, in this embodiment of this application, the feedback mode may be set in the PCF, to more flexibly determine whether the analysis information is invalid.

Figure 8:
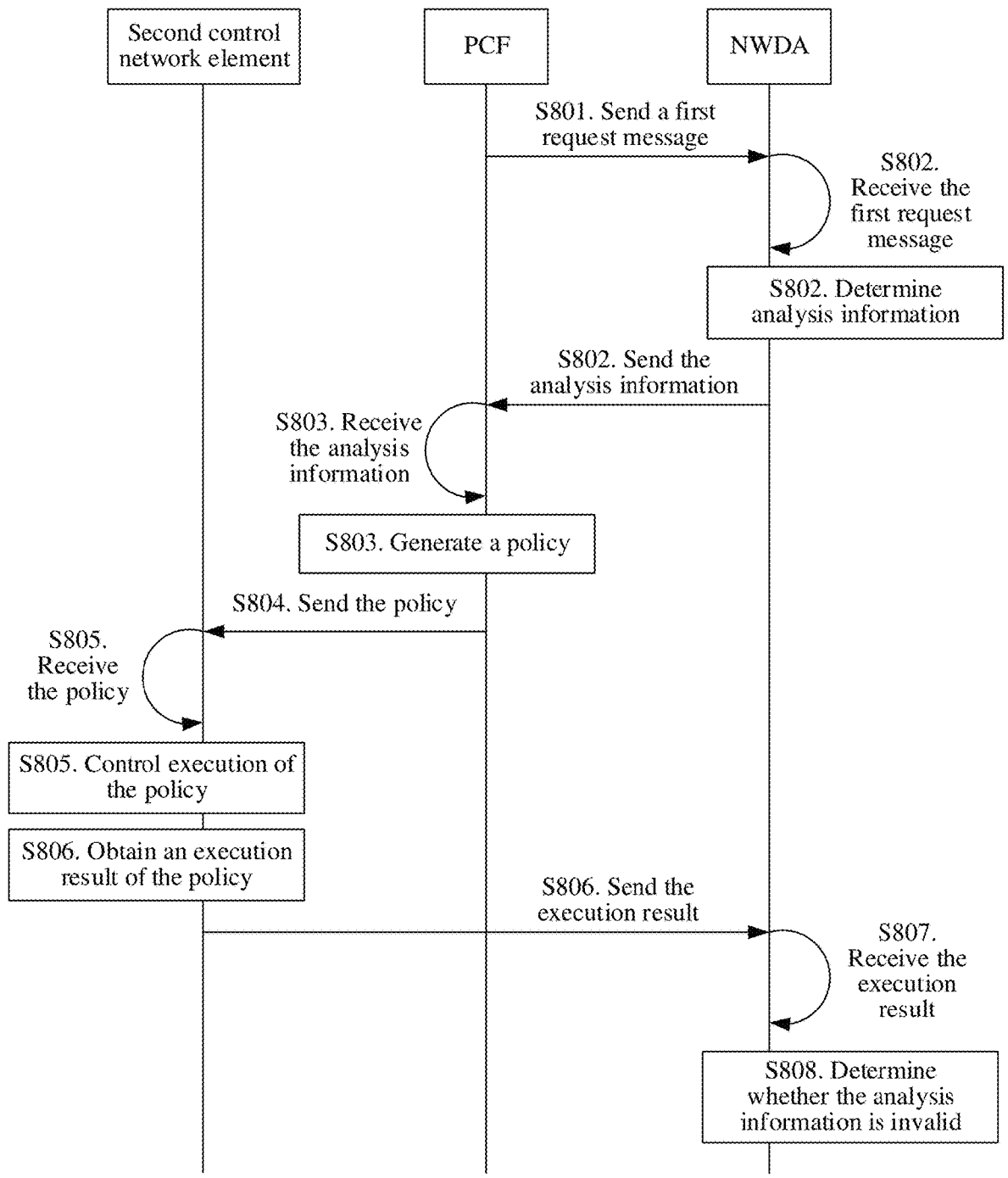
FIG. 8 is a schematic flowchart of still another communication method according to an embodiment of this application.

FIG. 8 is a schematic flowchart of still another communication method according to an embodiment of this application. As shown in FIG. 8, the method includes at least the following operations.

Operation S801: A first control network element PCF sends a first request message to an NWDA, where the first request message is used to request analysis information from the NWDA.

Operation S802: The NWDA receives the first request message, determines the analysis information based on the first request message, and sends the analysis information to the PCF.

Operation S803: The PCF receives the analysis information, and generates a policy based on the analysis information.

Operation S804: The PCF sends the policy to a second control network element.

Operation S805: The second control network element receives the policy, and controls execution of the policy.

Operation S806: The second control network element obtains an execution result of the policy, and sends the execution result to the NWDA.

Operation S807: The NWDA receives the execution result.

Operation S808: The NWDA determines, based on the execution result, whether the analysis information is invalid.

In one embodiment, the PCF may generate the corresponding policy based on the analysis information sent by the NWDA, and deliver the policy to the corresponding second control network element. The second control network element can control the execution of the policy, and can obtain the execution result of the policy. Herein, the second control network element may directly send the execution result to the NWDA, and the NWDA determines, based on the received execution result, whether the analysis information is invalid.

For a specific examples of sending the execution result by the second control network element to the NWDA, refer to the embodiments of sending the execution result by the PCF to the NWDA.

For a specific examples of determining, by the NWDA based on the execution result, whether the analysis information is invalid, refer to related descriptions in the foregoing embodiments, and details are not described herein again.

For specific examples of the operations in this embodiment, refer to related descriptions of corresponding operations in the foregoing method embodiments. Details are not described herein again.

It can be learned that in this embodiment of this application, the second control network element directly feeds back the execution result of the policy to the NWDA, so that the NWDA can determine, in a more timely manner, whether the analysis information is invalid, thereby improving policy update efficiency.

Figure 9:
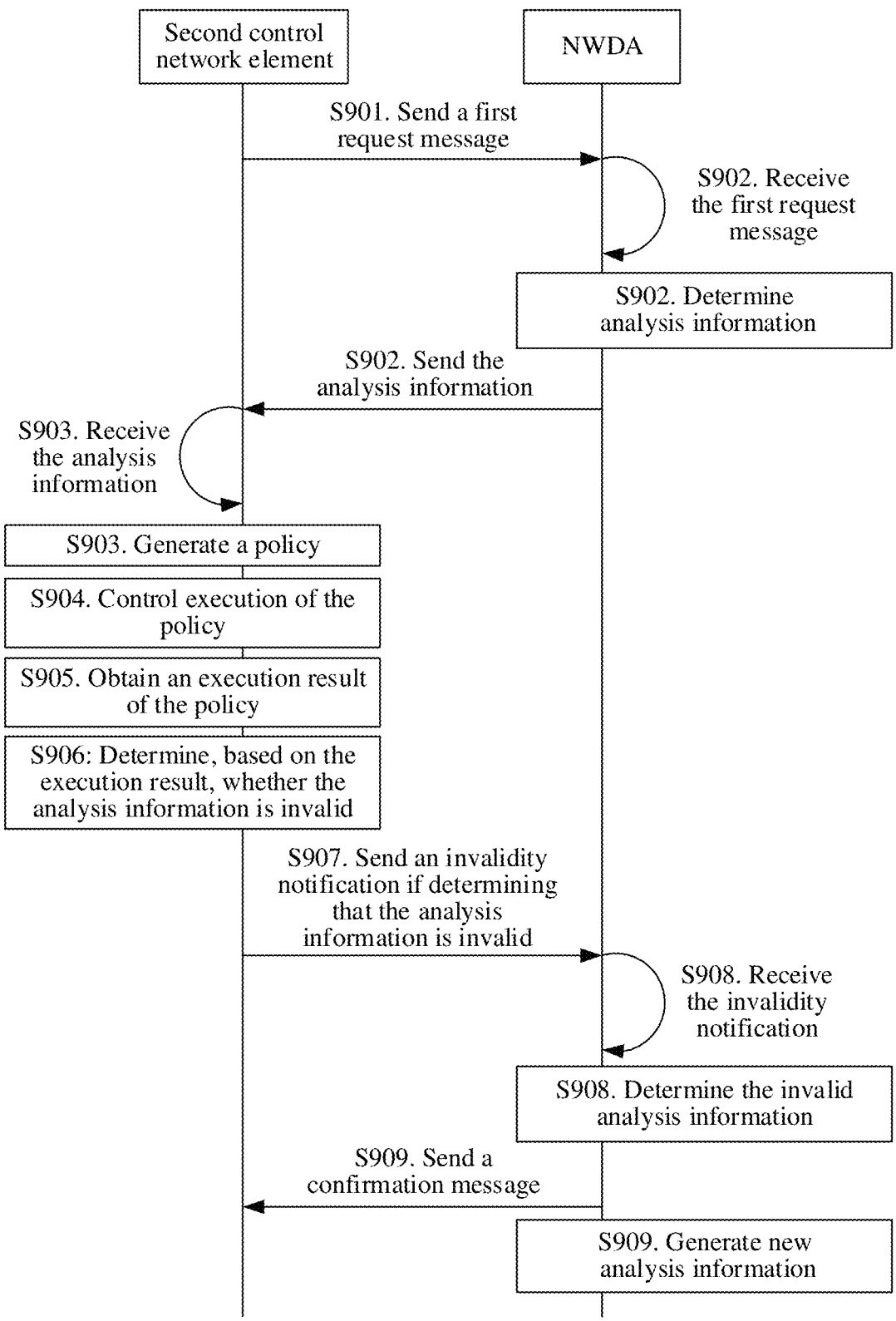
FIG. 9 is a schematic flowchart of still another communication method according to an embodiment of this application.

FIG. 9 is a schematic flowchart of still another communication method according to an embodiment of this application. As shown in FIG. 9, the method includes at least the following operations.

Operation S901: A second control network element sends a first request message to an NWDA, where the first request message is used to request analysis information.

Operation S902: The NWDA receives the first request message, determines the analysis information based on the first request message, and sends the analysis information to the second control network element.

Operation S903: The second control network element generates a policy based on the analysis information.

Operation S904: The second control network element controls execution of the policy.

Operation S905: The second control network element obtains an execution result of the policy.

Operation S906: The second control network element determines, based on the execution result, whether the analysis information is invalid.

Operation S907: If determining that the analysis information is invalid, the second control network element sends an invalidity notification message for the analysis information to the NWDA.

Operation S908: The NWDA receives the invalidity notification message, and determines the invalid analysis information based on the invalidity notification message.

Operation S909: The NWDA sends a confirmation message for the invalidity notification message to the second control network element, and generates new analysis information.

In one embodiment, the NWDA may determine, based on collected data, analysis information for the second control network element, and send the analysis information to the second control network element when a trigger condition is met. The trigger condition may be that the second control network element sends the first request message used to request the analysis information to the NWDA, a quantity of data counted by the second control network element reaches a preset threshold, or the like.

The second control network element may generate the corresponding policy based on the analysis information. For an example of generating the policy by the second control network element, refer to the embodiments of generating the policy by the PCF.

After obtaining the execution result of the policy, the second control network element may further determine, based on the execution result, whether the corresponding analysis information is invalid. For a determining manner, refer to the specific embodiments of determining, by the PCF, whether the analysis information is invalid.

For an example of sending the invalidity notification message by the second control network element, refer to the specific embodiments of sending the invalidity notification message by the PCF.

In this embodiment of this application, the NWDA may determine corresponding analysis information for a specific second control network element, so that policy formulation and execution can be more targeted. In addition, the execution result can be collected in time and the analysis information can be updated in time, to improve policy accuracy in time.

Figure 10:
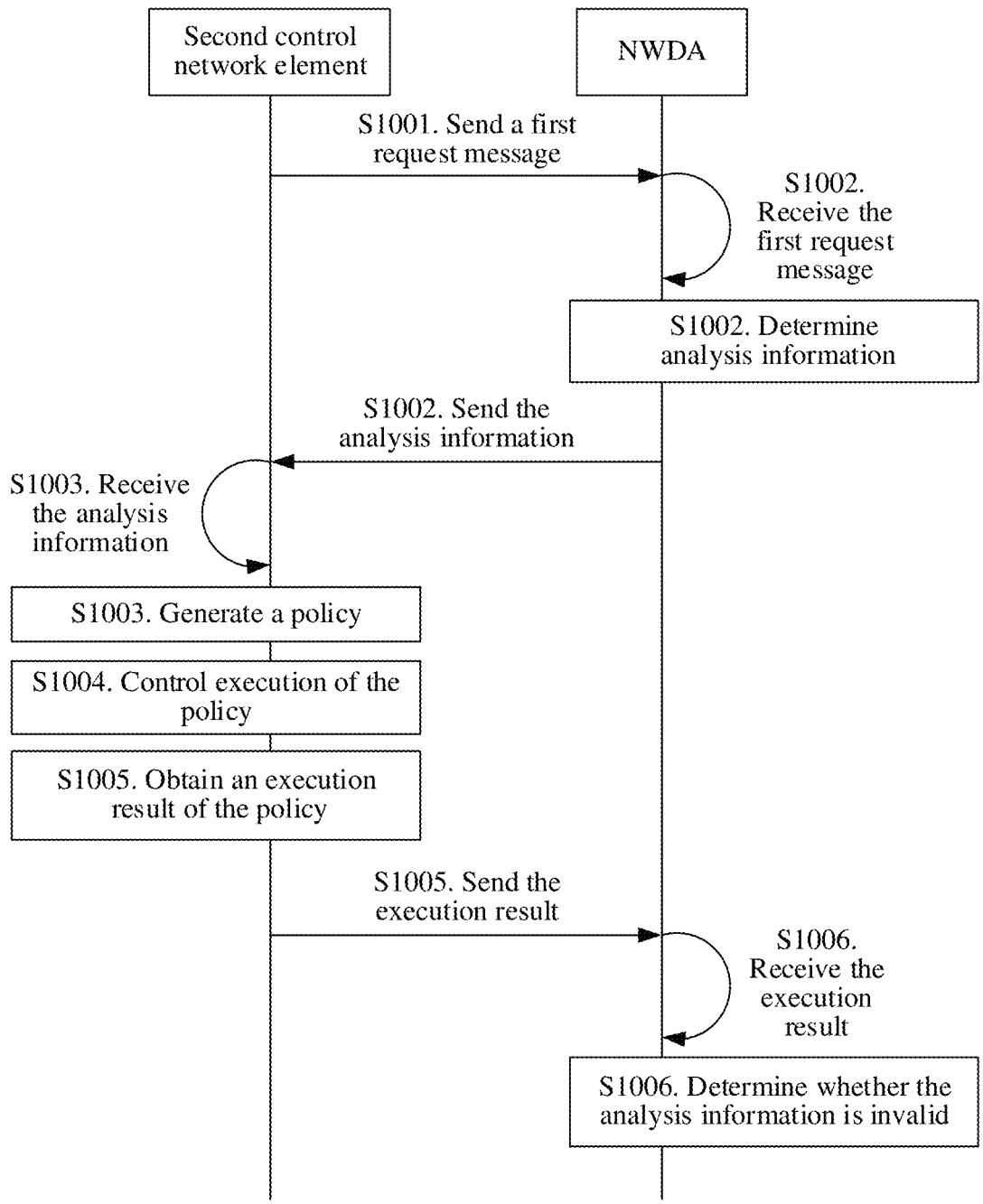
FIG. 10 is a schematic flowchart of still another communication method according to an embodiment of this application.

FIG. 10 is a schematic flowchart of still another communication method according to an embodiment of this application. As shown in FIG. 10, the method includes at least the following operations.

Operation S1001: A second control network element sends a first request message to an NWDA, where the first request message is used to request analysis information.

Operation S1002: The NWDA receives the first request message, determines the analysis information based on the first request message, and sends the analysis information to the second control network element.

Operation S1003: The second control network element receives the analysis information, and generates a policy based on the analysis information.

Operation S1004: The second control network element controls execution of the policy.

Operation S1005: The second control network element obtains an execution result of the policy, and sends the execution result to the NWDA.

Operation S1006: The NWDA receives the execution result, and determines, based on the received execution result, whether the analysis information is invalid.

In one embodiment, the NWDA may directly send the analysis information to the second control network element. The second control network element can generate the policy based on the analysis information, and control the execution of the policy. After obtaining the execution result of the policy, the second control network element may send the execution result to the NWDA. The NWDA determines, based on the execution result, whether the corresponding analysis information is invalid. In this way, the NWDA can generate new analysis information in time, thereby ensuring an execution hit rate of the policy.

For specific examples of the foregoing operations in this embodiment of this application, refer to related descriptions in the foregoing method embodiments. Details are not described herein again.

The following describes apparatus embodiments provided in this application. The apparatus embodiments can implement the foregoing method embodiments.

Figure 11:
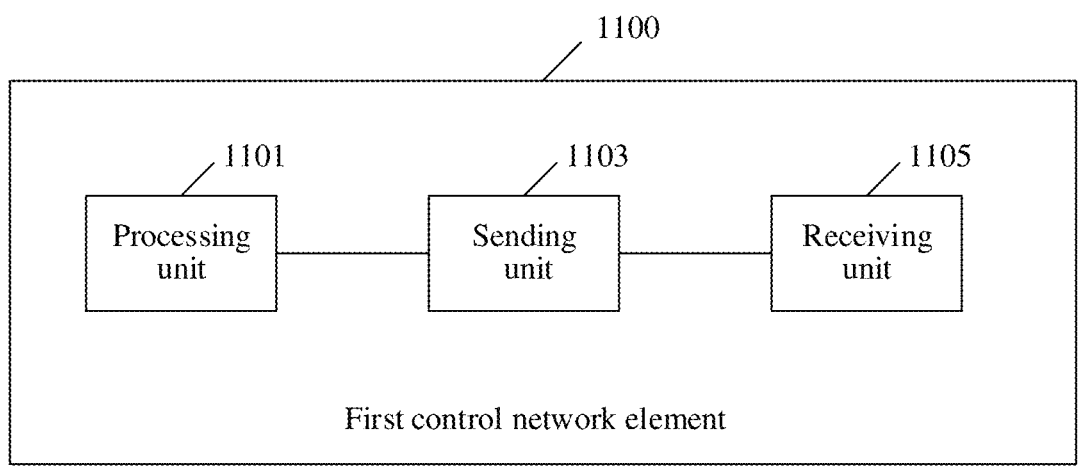
FIG. 11 is a composition diagram of units of a first control network element PCF according to an embodiment of this application.

FIG. 11 is a composition diagram of units of a first control network element according to an embodiment of this application. The first control network element may be the PCF in the foregoing communications system, or the first control network element may be another network element that generates a policy in the communications system. This is not limited herein. The first control network element may be configured to perform actions of the first control network element in the foregoing method embodiments. As shown in FIG. 11, the first control network element 1100 may include a receiving unit 1101, a processing unit 1103, and a sending unit 1105.

The processing unit 1103 is configured to: receive analysis information of a network data analytics network element NWDA by using the receiving unit, and generate a policy based on the analysis information.

The sending unit 1105 is configured to send the policy to a second control network element, where execution of the policy is controlled by the second control network element.

The processing unit 1103 is further configured to: receive, by using the receiving unit, an execution result of the policy that is sent by the second control network element, and determine, based on the execution result, whether the analysis information is invalid.

The sending unit 1105 is further configured to: when the processing unit determines that the analysis information is invalid, send, by the first control network element, an invalidity notification message to the NWDA, where the invalidity notification message is used to instruct the NWDA to generate new analysis information.

In one embodiment, the foregoing units are further configured to implement the method performed by the first control network element in the foregoing method embodiments. Details are not described herein again.

In this embodiment, the first control network element 1100 is presented in a unit form. The "unit" herein may be an application-specific integrated circuit (ASIC), a processor and a memory that execute one or more software or firmware programs, an integrated logic circuit, and/or another device that can provide the foregoing functions. Functions of the foregoing units may be implemented by the following first control network element 1200.

Figure 12:
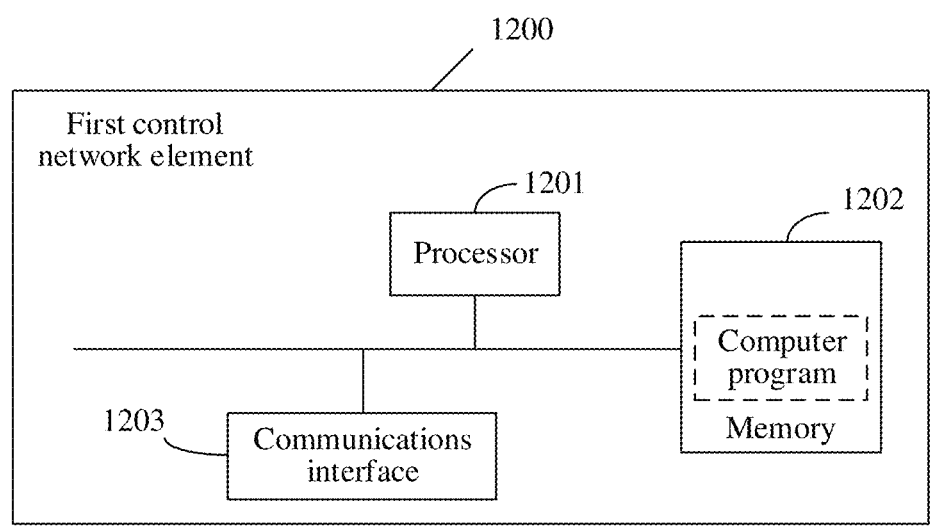
FIG. 12 is a schematic structural diagram of a first control network element PCF according to an embodiment of this application.

FIG. 12 shows the first control network element 1200 according to some embodiments of this application. The first control network element 1200 includes at least one processor 1201, at least one memory 1202, and at least one communications interface 1203. The processor 1201, the memory 1202, and the communications interface 1203 are connected and communicate with each other by using the communications bus.

The processor 1201 may be a general-purpose central processing unit (CPU), a microprocessor, an application-specific integrated circuit (ASIC), or one or more integrated circuits configured to control program execution of the foregoing solutions.

The communications interface 1203 is configured to communicate with another network element or a communications network, such as the Ethernet, a radio access network (RAN), or a wireless local area network (WLAN). The receiving unit 1101 and the sending unit 1105 in the first control network element 1100 may communicate with another network element by using the communications interface 1203.

The memory 1202 may be a read-only memory (ROM) or another type of static storage device capable of storing static information and instructions, or a random access memory (RAM) or another type of dynamic storage device capable of storing information and instructions, or may be an electrically erasable programmable read-only memory (EEPROM), a compact disc read-only memory (CD-ROM) or another optical disc storage, optical disc storage (including a compact disc, a laser disc, an optical disc, a digital versatile disc, a Blu-ray disc, or the like), or magnetic disk storage medium or another magnetic storage device, or any other medium that can be used to carry or store expected program code in an instruction or data structure form and that can be accessed by a computer, but is not limited thereto. The memory may exist independently, and is connected to the processor by using the bus. Alternatively, the memory may be integrated with the processor.

The memory 1202 is configured to store a computer program for executing the foregoing solutions, and the processor 1201 controls the execution. The processor 1201 is configured to execute the computer program stored in the memory 1202.

The computer program stored in the memory 1202 may be used to perform the method performed by the first control network element provided in the foregoing method embodiments.

For example, the processor 1201 invokes the computer program to perform the following operations:

sending the policy to a second control network element, where execution of the policy is controlled by the second control network element; receiving, by using the receiving unit, an execution result of the policy that is sent by the second control network element, and determining, based on the execution result, whether the analysis information is invalid; and when the analysis information is invalid, sending an invalidity notification message to the NWDA, where the invalidity notification message is used to instruct the NWDA to generate new analysis information.

In one embodiment, the analysis information carries a maximum quantity of failures, and the determining, by the processor 1201 based on the execution result, whether the analysis information is invalid includes: determining whether a quantity of received execution failures in the received execution result reaches the maximum quantity of failures; and when determining that the quantity of received execution failures reaches the maximum quantity of failures, determining that the analysis information is invalid.

In one embodiment, the determining, by the processor 1201 based on the execution result, whether the analysis information is invalid includes: counting a percentage of a quantity of execution failures that are in the received execution result in an execution quantity; and if the percentage is greater than a first threshold, determining that the analysis information is invalid.

In one embodiment, the processor 1201 further invokes the computer program to perform the following operations: determining whether a quantity of received execution results reaches a second threshold; and when determining that the quantity of execution results reaches the second threshold, counting the percentage of the quantity of execution failures that are in the received execution result in the execution quantity.

In one embodiment, the processor 1201 further invokes the computer program to perform the following operations: receiving a confirmation message sent by the NWDA, where the confirmation message is sent by the NWDA after the NWDA receives the invalidity notification message, the confirmation message carries a cooling time, and the cooling time is used to indicate duration used by the NWDA to generate new analysis information; and sending a request message to the NWDA after the cooling time, where the request message is used to request the new analysis information.

Certainly, the processor 1201 may further invoke the computer program to perform any method in the foregoing embodiments, and details are not described herein again.

Figure 13:
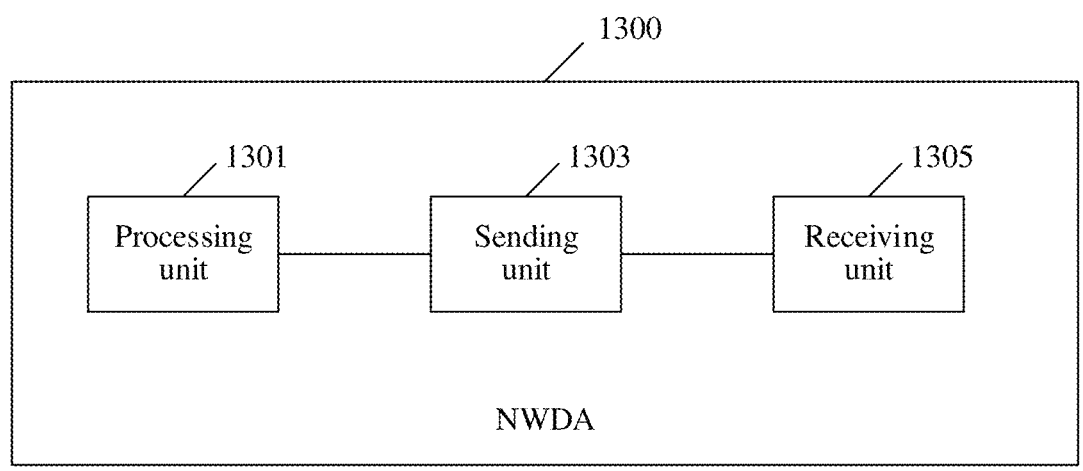
FIG. 13 is a composition diagram of units of a network data analytics network element NWDA according to an embodiment of this application.

FIG. 13 is a composition diagram of units of a network data analytics network element NWDA according to an embodiment of this application. The NWDA may be configured to perform actions of the NWDA in the foregoing method embodiments. As shown in FIG. 13, the NWDA 1300 may include a receiving unit 1301, a processing unit 1303, and a sending unit 1305.

The sending unit 1305 is configured to send analysis information to a first control network element, where the analysis information is used to instruct the first control network element to generate a policy based on the analysis information.

The receiving unit 1301 is configured to receive an invalidity notification message sent by the first control network element, where the invalidity notification message is used to instruct the NWDA to generate new analysis information.

The processing unit 1303 is configured to generate the new analysis information.

In one embodiment, the foregoing units are further configured to implement the method performed by the NWDA in the foregoing method embodiments. Details are not described herein again.

In this embodiment, the NWDA 1300 is presented in a unit form. The "unit" herein may be an application-specific integrated circuit (ASIC), a processor and a memory that execute one or more software or firmware programs, an integrated logic circuit, and/or another device that can provide the foregoing functions. Functions of the foregoing units may be implemented by the following NWDA 1400.

Figure 14:
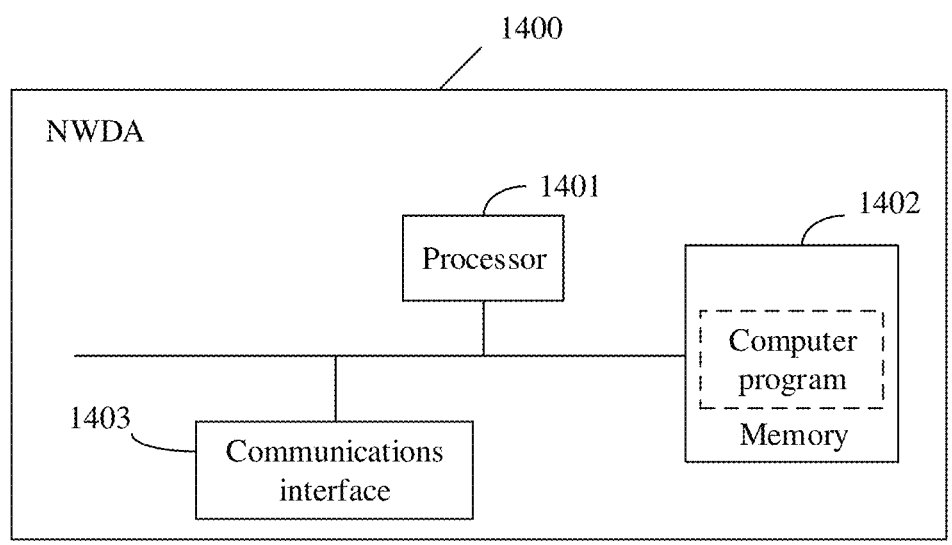
FIG. 14 is a schematic structural diagram of a network data analytics network element NWDA according to an embodiment of this application.

FIG. 14 shows the NWDA 1400 according to some embodiments of this application. The NWDA 1400 includes at least one processor 1401, at least one memory 1402, and at least one communications interface 1403. The processor 1401, the memory 1402, and the communications interface 1403 are connected and communicate with each other by using the communications bus.

The processor 1401 may be a general-purpose central processing unit (CPU), a microprocessor, an application-specific integrated circuit (ASIC), or one or more integrated circuits configured to control program execution of the foregoing solutions.

The communications interface 1403 is configured to communicate with another network element or a communications network, such as the Ethernet, a radio access network (RAN), or a wireless local area network (WLAN). The receiving unit 1101 and the sending unit 1105 in the NWDA 1100 may communicate with another network element by using the communications interface 1403.

The memory 1402 may be a read-only memory (ROM) or another type of static storage device capable of storing static information and instructions, or a random access memory (RAM) or another type of dynamic storage device capable of storing information and instructions, or may be an electrically erasable programmable read-only memory (EEPROM), a compact disc read-only memory (CD-ROM) or another optical disc storage, optical disc storage (including a compact disc, a laser disc, an optical disc, a digital versatile disc, a Blu-ray disc, or the like), or magnetic disk storage medium or another magnetic storage device, or any other medium that can be used to carry or store expected program code in an instruction or data structure form and that can be accessed by a computer, but is not limited thereto. The memory may exist independently, and is connected to the processor by using the bus. Alternatively, the memory may be integrated with the processor.

The memory 1402 is configured to store a computer program for executing the foregoing solutions, and the processor 1401 controls the execution. The processor 1401 is configured to execute the computer program stored in the memory 1402.

The computer program stored in the memory 1402 may be used to perform the method performed by the NWDA provided in the foregoing method embodiments.

For example, the processor 1201 invokes the computer program to perform the following operations: sending analysis information to a first control network element, where the analysis information is used to instruct the first control network element to generate a policy based on the analysis information; receiving, by the NWDA, an invalidity notification message sent by the first control network element, where the invalidity notification message is used to instruct the NWDA to generate new analysis information; and generating, by the NWDA, the new analysis information.

Certainly, the processor 1201 may further invoke the computer program to perform any method in the foregoing embodiments, and details are not described herein again.

Figure 15:
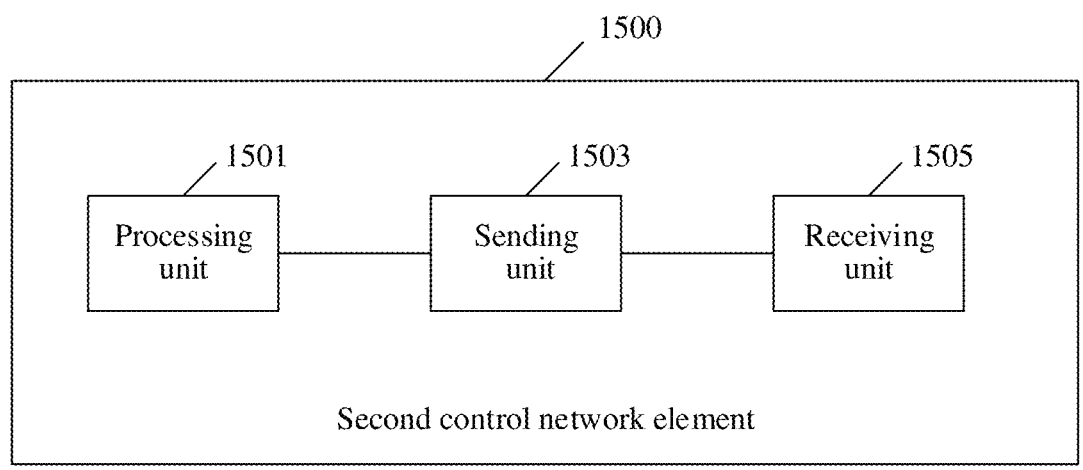
FIG. 15 is a composition diagram of units of a second control network element according to an embodiment of this application.

FIG. 15 is a composition diagram of units of a second control network element according to an embodiment of this application. The second control network element may be an AMF or an SMF in the foregoing communications system, or another network element configured to control policy execution or execute a policy. This is not limited herein. The second control network element may be configured to perform actions of the second control network element in the foregoing method embodiments. As shown in FIG. 15, the second control network element 1500 may include a receiving unit 1501, a processing unit 1503, and a sending unit 1505.

The receiving unit 1501 is configured to receive a policy sent by a first control network element, where the policy is generated based on analysis information of a network data analytics network element NWDA.

The processing unit 1503 is configured to: control execution of the policy, and learn of an execution result of the policy.

The sending unit 1505 is configured to send the execution result to the first control network element, where the first control network element is configured to determine, based on the execution result, whether the analysis information is invalid.

In one embodiment, the foregoing units are further configured to implement the method performed by the second control network element in the foregoing method embodiments. Details are not described herein again.

In this embodiment, the second control network element 1500 is presented in a unit form. The "unit" herein may be an application-specific integrated circuit (ASIC), a processor and a memory that execute one or more software or firmware programs, an integrated logic circuit, and/or another device that can provide the foregoing functions. Functions of the foregoing units may be implemented by the following second control network element 1600.

Figure 16:
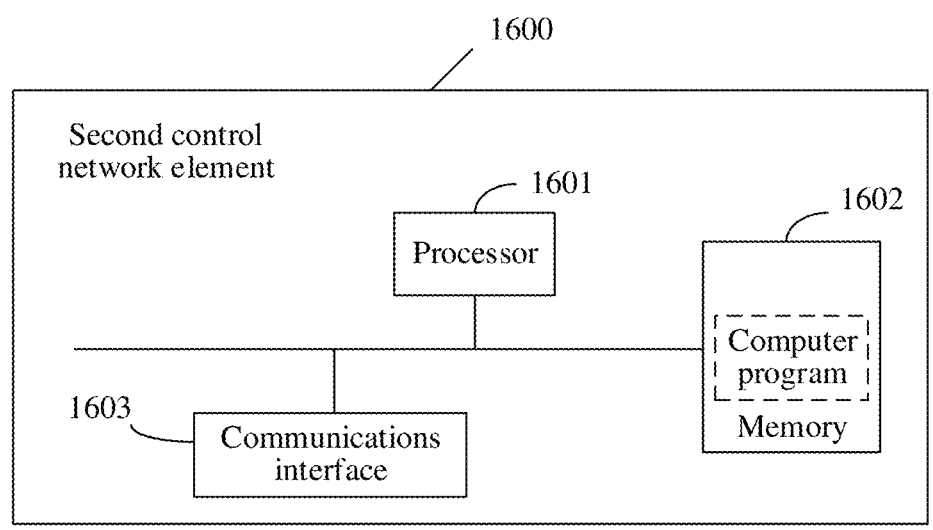
FIG. 16 is a schematic structural diagram of a second control network element according to an embodiment of this application.

FIG. 16 shows the second control network element 1600 according to some embodiments of this application. The second control network element 1600 includes at least one processor 1601, at least one memory 1602, and at least one communications interface 1603. The processor 1601, the memory 1602, and the communications interface 1603 are connected and communicate with each other by using the communications bus.

The processor 1601 may be a general-purpose central processing unit (CPU), a microprocessor, an application-specific integrated circuit (ASIC), or one or more integrated circuits configured to control program execution of the foregoing solutions.

The communications interface 1603 is configured to communicate with another network element or a communications network, such as the Ethernet, a radio access network (RAN), or a wireless local area network (WLAN). The receiving unit 1101 and the sending unit 1105 in the second control network element 1100 may communicate with another network element by using the communications interface 1603.

The memory 1602 may be a read-only memory (ROM) or another type of static storage device capable of storing static information and instructions, or a random access memory (RAM) or another type of dynamic storage device capable of storing information and instructions, or may be an electrically erasable programmable read-only memory (EEPROM), a compact disc read-only memory (CD-ROM) or another optical disc storage, optical disc storage (including a compact disc, a laser disc, an optical disc, a digital versatile disc, a Blu-ray disc, or the like), or magnetic disk storage medium or another magnetic storage device, or any other medium that can be used to carry or store expected program code in an instruction or data structure form and that can be accessed by a computer, but is not limited thereto. The memory may exist independently, and is connected to the processor by using the bus. Alternatively, the memory may be integrated with the processor.

The memory 1602 is configured to store a computer program for executing the foregoing solutions, and the processor 1601 controls the execution. The processor 1601 is configured to execute the computer program stored in the memory 1602.

The computer program stored in the memory 1602 may be used to perform the method performed by the second control network element provided in the foregoing method embodiments. For example, the processor 1201 invokes the computer program to perform the following operations: receiving a policy sent by a first control network element, where the policy is generated based on analysis information of a network data analytics network element NWDA; controlling execution of the policy, and learning of an execution result of the policy; and sending the execution result to the first control network element, where the first control network element is configured to determine, based on the execution result, whether the analysis information is invalid.

Certainly, the processor 1201 may further invoke the computer program to perform any method in the foregoing embodiments, and details are not described herein again.

What is claimed is:

1. A communication method, comprising:
sending, by a network data analytics network element (NWDA), analysis information to a first control network element;
receiving, by the first control network element, the analysis information, and generating a policy based on the analysis information;
sending, by the first control network element, the policy to a second control network element, wherein execution of the policy is controlled by the second control network element;
receiving, by the first control network element, an execution result of the policy that is sent by the second control network element, and determining, based on the execution result, whether the analysis information is invalid; and
sending, by the first control network element, an invalidity notification message to the NWDA when the first control network element determines that the analysis information is invalid, wherein the invalidity notification message is used to instruct the NWDA to generate new analysis information.

2. The method according to claim 1, wherein the invalidity notification message comprises an information identifier, and the information identifier corresponds to the analysis information.

3. The method according to claim 1, wherein the analysis information carries a maximum quantity of failures, and wherein determining, by the first control network element based on the execution result, whether the analysis information is invalid comprises:
determining, by the first control network element, whether a quantity of received execution failures in the received execution result reaches the maximum quantity of failures; and
when determining that the quantity of received execution failures reaches the maximum quantity of failures, determining, by the first control network element, that the analysis information is invalid.

4. The method according to claim 1, wherein determining, by the first control network element based on the execution result, whether the analysis information is invalid comprises:
counting, by the first control network element, a percentage of a quantity of execution failures that are in the received execution result in an execution quantity; and
if the percentage is greater than a first threshold, determining, by the first control network element, that the analysis information is invalid.

5. The method according to claim 4, wherein the first threshold is preconfigured, or the first threshold is determined based on the analysis information.

6. The method according to claim 4, further comprising:
determining, by the first control network element, whether a quantity of received execution results reaches a second threshold; and
when determining that the quantity of execution results reaches the second threshold, counting, by the first control network element, the percentage of the quantity of execution failures that are in the received execution result in the execution quantity.

7. The method according to claim 1, further comprising:
receiving, by the first control network element, a confirmation message sent by the NWDA, wherein the confirmation message is sent by the NWDA after the NWDA receives the invalidity notification message, the confirmation message carries a cooling time, and the cooling time is used to indicate duration used by the NWDA to generate new analysis information; and
sending, by the first control network element, a request message to the NWDA after the cooling time, wherein the request message is used to request the new analysis information.

8. The method according to claim 1, wherein the analysis information comprises at least one of user analysis information, network slice analysis information, analysis information related to an operator specific service, and session analysis information.

9. A communications system, comprising a first control network element,
a network data analytics network element (NWDA), and a second control network element, wherein the NWDA is configured to send a network data analytics network element NWDA, analysis information to the first control network element;
the first control network element is configured to:
receive the analysis information, and generate a policy based on the analysis information;

send the policy to a second control network element, wherein execution of the policy is controlled by the second control network element;

receive an execution result of the policy that is sent by the second control network element, and determine based on the execution result, whether the analysis information is invalid; and send an invalidity notification message to the NWDA when the first control network element determines that the analysis information is invalid, wherein the invalidity notification message is used to instruct the NWDA to generate new analysis information.

10. The system according to claim 9, wherein the invalidity notification message comprises an information identifier, and the information identifier corresponds to the analysis information.

11. The system according to claim 9, wherein the analysis information carries a maximum quantity of failures, and the first control network element is further configured to:

determine whether a quantity of received execution failures in the received execution result reaches the maximum quantity of failures; and when determining that the quantity of received execution failures reaches the maximum quantity of failures, determine that the analysis information is invalid.

12. The system according to claim 9, wherein the first control network element is further configured to:

count a percentage of a quantity of execution failures that are in the received execution result in an execution quantity; and if the percentage is greater than a first threshold, determine that the analysis information is invalid.

13. The system according to claim 12, wherein the first threshold is preconfigured, or the first threshold is determined based on the analysis information.

14. The system according to claim 12, wherein the first control network element is further configured to:

determine whether a quantity of received execution results reaches a second threshold; and when determining that the quantity of execution results reaches the second threshold, count the percentage of the quantity of execution failures that are in the received execution result in the execution quantity.

15. The system according to claim 9, wherein the first control network element is further configured to:

receive a confirmation message sent by the NWDA, wherein the confirmation message is sent by the NWDA after the NWDA receives the invalidity notification message, the confirmation message carries a cooling time, and the cooling time is used to indicate duration used by the NWDA to generate new analysis information; and send a request message to the NWDA after the cooling time, wherein the request message is used to request the new analysis information.

16. The system according to claim 9, wherein the analysis information comprises at least one of user analysis information, network slice analysis information, analysis information related to an operator specific service, and session analysis information.

17. A computer storage medium, comprising a computer instruction, wherein when the computer instruction is run on a processor, the processor is enabled to perform the following steps:

sending, by a network data analytics network element (NWDA), analysis information to a first control network element;

receiving, by the first control network element, the analysis information, and generating a policy based on the analysis information;

sending, by the first control network element, the policy to a second control network element, wherein execution of the policy is controlled by the second control network element;

receiving, by the first control network element, an execution result of the policy that is sent by the second control network element, and determining, based on the execution result, whether the analysis information is invalid; and sending, by the first control network element, an invalidity notification message to the NWDA when the first control network element determines that the analysis information is invalid, wherein the invalidity notification message is used to instruct the NWDA to generate new analysis information.

18. The computer storage medium according to claim 17, wherein the invalidity notification message comprises an information identifier, and the information identifier corresponds to the analysis information.

19. The computer storage medium according to claim 17, wherein the analysis information carries a maximum quantity of failures, and wherein determining, by the first control network element based on the execution result, whether the analysis information is invalid comprises:

determining, by the first control network element, whether a quantity of received execution failures in the received execution result reaches the maximum quantity of failures; and when determining that the quantity of received execution failures reaches the maximum quantity of failures, determining, by the first control network element, that the analysis information is invalid.

20. The computer storage medium according to claim 17, wherein determining, by the first control network element based on the execution result, whether the analysis information is invalid comprises:

counting, by the first control network element, a percentage of a quantity of execution failures that are in the received execution result in an execution quantity; and if the percentage is greater than a first threshold, determining, by the first control network element, that the analysis information is invalid.

* * * * *